United States Patent
Loehr et al.

(10) Patent No.: US 10,187,832 B2
(45) Date of Patent: Jan. 22, 2019

(54) UPLINK SWITCHING OF COMMUNICATION LINKS FOR MOBILE STATIONS IN DUAL CONNECTIVITY

(71) Applicant: Panasonic Intellectual Property Corporation of America, Torrance, CA (US)

(72) Inventors: Joachim Loehr, Langen (DE); Prateek Basu Mallick, Langen (DE)

(73) Assignee: Panasonic Intellectual Property Corporation of America, Torrance, CA (US)

(*) Notice: Subject to any disclaimer, the term of this patent is extended or adjusted under 35 U.S.C. 154(b) by 434 days.

(21) Appl. No.: 14/895,480

(22) PCT Filed: May 27, 2014

(86) PCT No.: PCT/EP2014/060956
§ 371 (c)(1),
(2) Date: Dec. 2, 2015

(87) PCT Pub. No.: WO2014/202353
PCT Pub. Date: Dec. 24, 2014

(65) Prior Publication Data
US 2016/0119840 A1 Apr. 28, 2016

(30) Foreign Application Priority Data
Jun. 21, 2013 (EP) .................... 13003188

(51) Int. Cl.
*H04W 36/08* (2009.01)
*H04W 72/04* (2009.01)
(Continued)

(52) U.S. Cl.
CPC ........... *H04W 36/08* (2013.01); *H04L 1/1812* (2013.01); *H04W 36/06* (2013.01);
(Continued)

(58) Field of Classification Search
None
See application file for complete search history.

(56) References Cited

U.S. PATENT DOCUMENTS 9,320,038 B2* 4/2016 Choi .................... H04L 1/1861
2014/0293896 A1* 10/2014 Kuo .................. H04W 72/0413
370/329
(Continued)

OTHER PUBLICATIONS

3GPP TS 36.211 V10.0.0, "3rd Generation Partnership Project; Technical Specification Group Radio Access Network, Evolved Universal Terrestrial Radio Access (E-UTRA); Physical channels and modulation (Release 10)," Dec. 2010, 103 pages.
(Continued)

*Primary Examiner* — Hicham B Foud
(74) *Attorney, Agent, or Firm* — Seed IP Law Group LLP

(57) ABSTRACT

The invention relates to a method for configuring subframes for uplink/downlink communication for a mobile station (UE) not supporting dual uplink but located in a communication system supporting dual connectivity. The UE is connected simultaneously to two base stations via a respective communication link. An uplink transmission pattern is determined, defining whether subframes are usable for uplink communication to the first or second base station or for switching the uplink communication between the two communication links. Based on the determined uplink transmission pattern, and further based on configuration of the mobile station for supporting dual reception or not, a downlink reception is derived for downlink communication between the two base stations and the mobile station, the downlink reception pattern defining whether the subframes are usable for downlink communication from the first or second base station or for switching the downlink communication between the two communication links.

17 Claims, 17 Drawing Sheets

(51) Int. Cl.
*H04L 1/18* (2006.01)
*H04W 36/06* (2009.01)
*H04W 88/06* (2009.01)

(52) U.S. Cl.
CPC .......... *H04W 72/0446* (2013.01); *H04L 1/18* (2013.01); *H04W 88/06* (2013.01)

(56) References Cited

U.S. PATENT DOCUMENTS

| | | | |
|---|---|---|---|
| 2015/0188690 A1* | 7/2015 | Khoryaev | H04W 52/0251 370/280 |
| 2015/0351119 A1* | 12/2015 | Song | H04W 72/1268 370/329 |
| 2016/0037405 A1* | 2/2016 | Choi | H04W 76/10 455/444 |
| 2016/0286449 A1* | 9/2016 | Choi | H04W 36/28 |
| 2018/0027581 A1* | 1/2018 | Khoryaev | H04W 72/1263 370/280 |

OTHER PUBLICATIONS

3GPP TS 36.212 V10.0.0, "3rd Generation Partnership Project; Technical Specification Group Radio Access Network, Evolved Universal Terrestrial Radio Access (E-UTRA); Multiplexing and channel coding (Release 10)," Dec. 2010, 72 pages.
3GPP TS 36.213 V10.0.1, "3rd Generation Partnership Project; Technical Specification Group Radio Access Network, Evolved Universal Terrestrial Radio Access (E-UTRA); Physical layer procedures (Release 10)," Dec. 2010, 98 pages.
3GPP TS 36.213 V11.1.0, "3rd Generation Partnership Project; Technical Specification Group Radio Access Network, Evolved Universal Terrestrial Radio Access (E-UTRA); Physical layer procedures (Release 11)," Dec. 2012, 160 pages.
3GPP TS 36.331 V11.3.0, 3rd Generation Partnership Project; Technical Specification Group Radio Access Network; Evolved Universal Terrestrial Radio Access (E-UTRA); Radio Resource Control (RRC); Protocol specification (Release 11), Mar. 2013, 344 pages.
3GPP TR 36.842 V0.2.0, "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)," May 2013, 38 pages.
3GPP TR 36.932 V12.1.0, "3rd Generation Partnership Project; Technical Specification Group Radio Access Network; Scenarios and requirements for small cell enhancements for E-UTRA and E-UTRAN (Release 12)," Mar. 2013, 14 pages.
Asustek, "Discussion on dual connectivity for single UL CC capable UEs," R2-131848, 3GPP TSG-RAN WG2 Meeting #82, Agenda Item: 7.2.1, Fukuoka, Japan, May 20-24, 2013, 4 pages.
Fujitsu, "The challenges of dual connectivity for single RX/TX capable UEs," R2-131856, 3GPP TSG-RAN WG2 Meeting #82, Agenda Item: 7.2.1, Fukuoka, Japan, May 20-24, 2013, 5 pages.
Intel Corporation, "Challenges in the uplink to support dual connectivity," R2-131986, 3GPP TSG RAN WG2 Meeting #82, Agenda Item: 7.2.1, Fukuoka, Japan, May 20-25, 2013, 7 pages.
Intel Corporation, "Dual connectivity for UEs supporting one UL CC," R2-131410, 3GPP TSG RAN WG2 Meeting #81bis, Agenda Item: 7.2, Chicago, USA, Apr. 15-19, 2013, 7 pages.
Intel Corporation, "PUCCH Transmission in Small Cell Environment," R1-130918, 3GPP TSG RAN WG1 Meeting #72bis, Agenda Item: 7.2.5.2.2, Chicago, USA, Apr. 15-19, 2013, 4 pages.
International Search Report dated Jun. 24, 2014, for corresponding International Application No. PCT/ EP2014/060956, 3 pages.
Extended European Search Report dated Dec. 18, 2013, for corresponding EP Application No. 13003188.3-1857, 10 pages.
Sesia et al., "LTE The UMTS Long Term Evolution—From Theory to Practice," 2nd Edition, Wiley & Sons, UK, 2011, 23 pages.

* cited by examiner

| Uplink-downlink configuration | Downlink-to-Uplink Switch-point periodicity | Subframe number | | | | | | | | | | Number of | | |
|---|---|---|---|---|---|---|---|---|---|---|---|---|---|---|
| | | 0 | 1 | 2 | 3 | 4 | 5 | 6 | 7 | 8 | 9 | D | U | S |
| 0 | 5 ms | D | S | U | U | U | D | S | U | U | U | 2 | 6 | 2 |
| 1 | 5 ms | D | S | U | U | D | D | S | U | U | D | 4 | 4 | 2 |
| 2 | 5 ms | D | S | U | D | D | D | S | U | D | D | 6 | 2 | 2 |
| 3 | 10 ms | D | S | U | U | U | D | D | D | D | D | 6 | 3 | 1 |
| 4 | 10 ms | D | S | U | U | D | D | D | D | D | D | 7 | 2 | 1 |
| 5 | 10 ms | D | S | U | D | D | D | D | D | D | D | 8 | 1 | 1 |
| 6 | 5 ms | D | S | U | U | U | D | S | U | U | D | 3 | 5 | 2 |

D    Downlink subframe

U    Uplink subframe

S    Special subframe

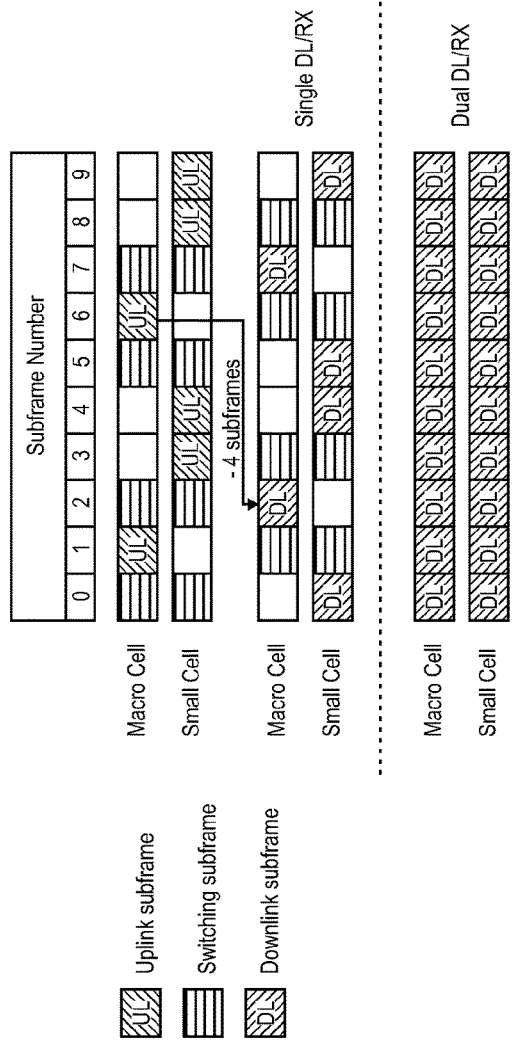
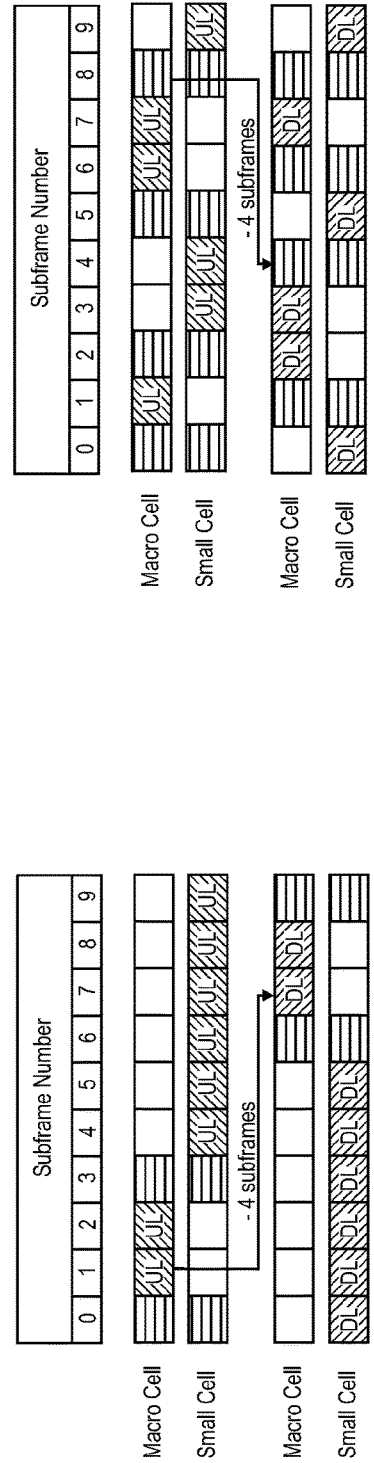
Fig. 21
Fig. 22
Fig. 23

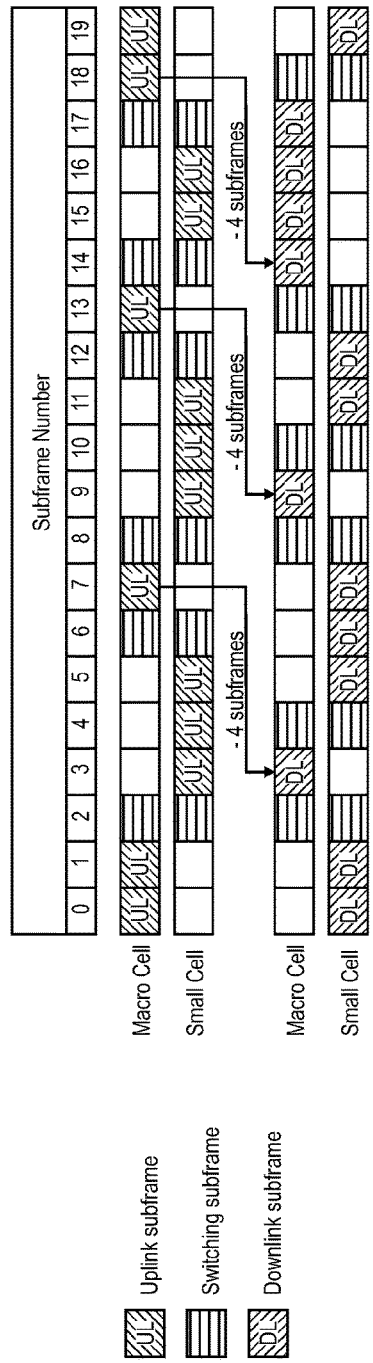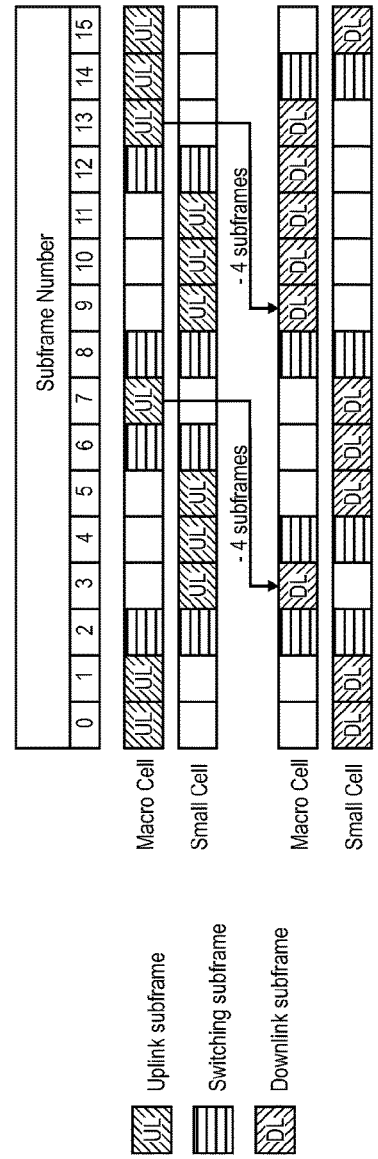

UPLINK SWITCHING OF COMMUNICATION LINKS FOR MOBILE STATIONS IN DUAL CONNECTIVITY

FIELD OF THE INVENTION

The invention relates to methods for configuring subframes for uplink and downlink communication. The invention is also providing the mobile station and the base station for performing the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE system is subdivided in the time-frequency domain in so-called subframes. In 3GPP LTE each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g. 7 OFDM symbols) and $N_{sc}^{RB}$ consecutive subcarriers in the frequency domain as exemplified in FIG. 4 (e.g. 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). The characteristics of the downlink and uplink PCell are:

1. For each SCell the usage of uplink resources by the UE, in addition to the downlink ones is configurable; the number of DL SCCs configured is therefore always larger or equal to the number of UL SCCs, and no SCell can be configured for usage of uplink resources only
2. The uplink PCell is used for transmission of Layer 1 uplink control information
3. The downlink PCell cannot be de-activated, unlike SCells
4. From UE perspective, each uplink resource only belongs to one serving cell
5. The number of serving cells that can be configured depends on the aggregation capability of the UE
6. Re-establishment is triggered when the downlink PCell experiences Rayleigh fading (RLF), not when downlink SCells experience RLF
7. The downlink PCell cell can change with handover (i.e. with security key change and RACH procedure)
8. Non-access stratum information is taken from the downlink PCell
9. PCell can only be changed with handover procedure (i.e. with security key change and RACH procedure)
10. PCell is used for transmission of PUCCH The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Logical and Transport Channels

The MAC layer provides a data transfer service for the RLC layer through logical channels. Logical channels are either Control Logical Channels which carry control data such as RRC signalling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only to be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information.

Shared Control Information (SCI) Carrying Cat 1 Information

The shared control information part of the L1/L2 control signaling contains information related to the resource allocation (indication). The shared control information typically contains the following information:

A user identity indicating the user(s) that is/are allocated the resources.

RB allocation information for indicating the resources (Resource Blocks (RBs)) on which a user(s) is/are allocated. The number of allocated resource blocks can be dynamic.

The duration of assignment (optional), if an assignment over multiple sub-frames (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Downlink Control Information (DCI) Carrying Cat 2/3 Information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:

- Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)
- Cat 3 information: HARQ related information, e.g. hybrid ARQ process number, redundancy version, retransmission sequence number Downlink control information occurs in several formats that differ in overall size and also in the information contained in its fields. The different DCI formats that are currently defined for LTE are described in detail in 3GPP TS 36.212, "Multiplexing and channel coding", section 5.3.3.1 (available at http://www.3gpp.org and incorporated herein by reference).

Uplink Control Information (UCI)

In general, uplink control signaling in mobile communication systems can be divided into two categories:

- Data-associated control signaling, is control signaling which is always transmitted together with uplink data and is used in the processing of that data. Examples include transport format indications, "New data" Indicator (NDIs) and MIMO parameters.
- Control signaling not associated with data is transmitted independently of any uplink data packet. Examples include HARQ Acknowledgements (ACK/NACK) for downlink data packets, Channel Quality Indicators (CQIs) to support link adaptation, and MIMO feedback such as Rank Indicators (RIs) and Precoding Matrix Indicators (PMI) for downlink transmissions. Scheduling Requests (SRs) for uplink transmissions also fall into this category.

Uplink data-associated control signaling is not necessary in LTE, as the relevant information is already known to the eNodeB. Therefore, only data-non-associated control signaling exists in the LTE uplink.

Consequently, the UCI can consist of:

Scheduling Requests (SRs)

HARQ ACK/NACK in response to downlink data packets on the PDSCH (Physical Downlink Shared CHannel). One ACK/NACK bit is transmitted in the case of single-codeword downlink transmission while two ACK/NACK bits are used in the case of two-codeword downlink transmission.

Channel State Information (CSI) which includes CQIs as well as the MIMO-related feedback consisting of RIs (Rank Indicator) and PMI (Precoding Matrix Indicator). 20 bits per subframe are used for the CSI. Channel state information which is required in the eNB for scheduling of downlink data transmissions.

The amount of UCI a UE can transmit in a subframe depends on the number of SC-FDMA symbols available for transmission of control signaling data. The PUCCH supports eight different formats, depending on the amount of information to be signaled. The following UCI formats on PUCCH are supported, according to the following overview

| PUCCH Format | Uplink Control Information (UCI) |
|---|---|
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CSI (20 coded bits) |
| Format 2 | CSI and 1- or 2-bit HARQ ACK/NACK for extended CP only |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 | Multiple ACK/NACKs for carrier aggregation: up to 20 ACK/NACK bits plus optional SR, in 48 coded bits |

Using the different defined PUCCH formats (according to 5.4.1 and 5.4.2 of TS 36.211), the following combinations of UCI on PUCCH are supported (see Section 10.1.1 of TS 36.213):

- Format 1a for 1-bit HARQ-ACK or in case of FDD for 1-bit HARQ-ACK with positive SR
- Format 1b for 2-bit HARQ-ACK or for 2-bit HARQ-ACK with positive SR
- Format 1b for up to 4-bit HARQ-ACK with channel selection when the UE is configured with more than one serving cell or, in the case of TDD, when the UE is configured with a single serving cell
- Format 1 for positive SR
- Format 2 for a CSI report when not multiplexed with HARQ-ACK
- Format 2a for a CSI report multiplexed with 1-bit HARQ-ACK for normal cyclic prefix
- Format 2b for a CSI report multiplexed with 2-bit HARQ-ACK for normal cyclic prefix
- Format 2 for a CSI report multiplexed with HARQ-ACK for extended cyclic prefix
- Format 3 for up to 10-bit HARQ-ACK for FDD and for up to 20-bit HARQ-ACK for TDD
- Format 3 for up to 11-bit corresponding to 10-bit HARQ-ACK and 1-bit positive/negative SR for FDD and for up to 21-bit corresponding to 20-bit HARQ-ACK and 1-bit positive/negative SR for TDD.
- Format 3 for multi-cell HARQ-ACK, 1-bit positive/negative SR and a CSI report for one serving cell.

Downlink & Uplink Data Transmission

Regarding downlink data transmission, L1/L2 control signaling is transmitted on a separate physical channel (PDCCH), along with the downlink packet data transmission. This L1/L2 control signaling typically contains information on:

- The physical resource(s) on which the data is transmitted (e.g. subcarriers or subcarrier blocks in case of OFDM, codes in case of CDMA). This information allows the mobile terminal (receiver) to identify the resources on which the data is transmitted.
- When user equipment is configured to have a Carrier Indication Field (CIF) in the L1/L2 control signaling, this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e. the cross-scheduled component carrier does not carry any L1/L2 control signaling.
- The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.

Hybrid ARQ (HARQ) information:
  HARQ process number: Allows the user equipment to identify the hybrid ARQ process on which the data is mapped.
  Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.
  Redundancy and/or constellation version: Tells the user equipment, which hybrid ARQ redundancy version is used (required for de-rate-matching) and/or which modulation constellation version is used (required for demodulation).
UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:
  The physical resource(s) on which the user equipment should transmit the data (e.g. subcarriers or subcarrier blocks in case of OFDM, codes in case of CDMA).
  When user equipment is configured to have a Carrier Indication Field (CIF) in the L1/L2 control signaling, this information identifies the component carrier for which the specific control signaling information is intended. This enables assignments to be sent on one component carrier which are intended for another component carrier. This other, cross-scheduled component carrier may be for example a PDCCH-less component carrier, i.e. the cross-scheduled component carrier does not carry any L1/L2 control signaling.
  L1/L2 control signaling for uplink grants is sent on the DL component carrier that is linked with the uplink component carrier or on one of the several DL component carriers, if several DL component carriers link to the same UL component carrier.
  The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:
  HARQ Process number: Tells the user equipment from which hybrid ARQ process it should pick the data.
  Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.
  Redundancy and/or constellation version: Tells the user equipment, which hybrid ARQ redundancy version to use (required for rate-matching) and/or which modulation constellation version to use (required for modulation).
UE Identity (UE ID): Tells which user equipment should transmit data. In typical implementations this information is used to mask the CRC of the L1/L2 control signaling in order to prevent other user equipments to read this information.

There are several different possibilities how to exactly transmit the information pieces mentioned above in uplink and downlink data transmission. Moreover, in uplink and downlink, the L1/L2 control information may also contain additional information or may omit some of the information. For example:
  HARQ process number may not be needed, i.e. is not signaled, in case of a synchronous HARQ protocol.
  A redundancy and/or constellation version may not be needed, and thus not signaled, if Chase Combining is used (always the same redundancy and/or constellation version) or if the sequence of redundancy and/or constellation versions is pre-defined.
  Power control information may be additionally included in the control signaling.
  MIMO related control information, such as e.g. precoding, may be additionally included in the control signaling.
  In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore, it should be noted that the redundancy version (RV) information is jointly encoded with the transport format information, i.e. the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RVO. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

Further detailed information on the control information can be found in 3GPP TS 36.212 Section 5.3.3 and 3GPP 36.213 Sections 7.1.7 and 8.6, incorporated herein by reference.

Channel Quality Reporting—CSI

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential.

The CSI is reported for every component carrier, and, depending on the reporting mode and bandwidth, for different sets of subbands of the component carrier. In 3GPP LTE, the smallest unit for which channel quality is reported is called a subband, which consists of multiple frequency-adjacent resource blocks.

As described before, user equipments will usually not perform and report CSI measurements on configured but deactivated downlink component carriers but only radio resource management related measurements like RSRP (Reference Signal Received Power) and RSRQ (Reference Signal Received Quality).

Details about the involved reporting and transmission mechanisms are given in the following specifications to which it is referred for further reading (all documents available at http://www.3gpp.org and incorporated herein by reference):

3GPP TS 36.211, "Evolved Universal Terrestrial Radio Access (E-UTRA); Physical channels and modulation", version 10.0.0, particularly sections 6.3.3, 6.3.4, 3GPP TS 36.212, "Evolved Universal Terrestrial Radio Access (E-UTRA); Multiplexing and channel coding", version 10.0.0, particularly sections 5.2.2, 5.2.4, 5.3.3, 3GPP TS 36.213, "Evolved Universal Terrestrial Radio Access (E-UTRA); Physical layer procedures", version 10.0.1, particularly sections 7.1.7, and 7.2.

The periodicity and frequency resolution to be used by a UE to report on the CSI are both controlled by the eNodeB. The Physical Uplink Control Channel (PUCCH) is used for periodic CSI reporting only (i.e. CSI reporting with a specific periodicity configured by RRC); the PUSCH is used for aperiodic reporting of the CSI, whereby the eNodeB specifically instructs (by a PDCCH) the UE to send an individual CSI report embedded into a resource which is scheduled for uplink data transmission.

Sounding Reference Symbol (SRS)

The SRS are important for uplink channel sounding to support dynamic uplink resource allocation, as well as for reciprocity-aided beamforming in the downlink. Uplink Sounding Reference Signals (SRS) are mainly used for channel quality estimation of the uplink channel which in turn is used as an input for the uplink scheduler, e.g. it enables frequency-selective scheduling.

Release 10 introduces the possibility of dynamically triggering individual SRS transmissions via the PDCCH; these dynamic aperiodic SRS transmissions are known as "type-1" SRSs, while the Release 8 periodic RRC-configured SRSs are known as "type-0" in Release 10.

An indicator in an uplink resource grant on the PDCCH can be used to trigger a single type 1 SRS transmission. This facilitates rapid channel sounding to respond to changes in traffic or channel conditions, without typing up SRS resources for a long period. In DCI format 0, one new bit can indicate activation of a type 1 SRS according to a set of parameters that is configured beforehand by RRC signaling. In DCI format 4, which is used for scheduling uplink SU-MIMO transmissions, two new bits allow one of three sets of RRC-configured type 1 SRS transmission parameters to be triggered.

The SRS transmissions are always in the last SC-FDMA symbol of the corresponding subframe where reporting is configured/scheduled. PUSCH data transmission is not permitted on the SC-FDMA signal designated for SRS, i.e. PUSCH transmission is punctured such that all symbols but the last are used for PUSCH.

Uplink Control Signaling and Multiplexing

When simultaneous uplink PUSCH data and control signaling are scheduled, the control signaling is normally multiplexed together with the data (in PUSCH) prior to the DFT spreading, in order to preserve the single-carrier low Cubic Metric (CM) property of the uplink transmission. The uplink control channel, PUCCH, is used by a UE to transmit any necessary control signaling only in subframes in which the UE has not been allocated any RBs for PUSCH transmission.

Further information on the multiplexing of the uplink control signaling can be found in Chapters 16.3.1.1, 16.3.3, 16.3.4, 16.3.5, 16.3.6, 16.3.7, 16.4 of *LTE—The UMTS Long Term Evolution—From Theory to Practice*, Edited by Stefanie Sesia, Issam Toufik, Matthew Baker, Second Edition, incorporated herein by reference Time Division Duplex—TDD LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 4, but only a subset of the subframes of a radio frame are available for downlink transmissions; the remaining subframes are used for uplink transmissions, or for special subframes. Special subframes are important to allow uplink transmission timings to be advanced, so as to make sure that transmitted signals from the UEs (i.e. uplink) arrive roughly at the same time at the eNodeB. Since the signal propagation delay is related to the distance between transmitter and receiver (neglecting reflection and other similar effects), this means that a signal transmitted by a UE near the eNodeB travels for a short time than the signals transmitted by a UE far from the eNodeB. In order to arrive at the same time, the far UE has to transmit its signal earlier than the near UE, which is solved by the so-called "timing advance" procedure in 3GPP systems. In TDD this has the additional circumstance that the transmission and reception occur on the same carrier frequency, i.e. downlink and uplink need to be duplexed in time domain. While a UE far from the eNodeB needs to start uplink transmission earlier than the near UE, conversely, a downlink signal is received by a near UE earlier than by the far UE. In order to be able to switch the circuitry from DL reception to UL transmission, guard time is defined in the special subframe. To additionally take care of the timing advanace problem, the guard time for a far UE needs to be longer than for a near UE.

This TDD structure is known as "Frame Structure Type 2" in 3GPP LTE Release 8 and later, of which seven different uplink-downlink configurations are defined, which allow a variety of downlink-uplink ratios and switching periodicities. FIG. 7 illustrates the table with the 7 different TDD uplink-downlink configurations, indexed from 0-6, where "D" shall indicate a downlink subframe, "U" an uplink subframe and "S" a special subframe. As can be seen therefrom, the seven available TDD uplink-downlink configurations can provide between 40% and 90% of downlink subframes (when, for simplicity, counting a special subframe as a downlink subframe, since part of such a subframe is available for downlink transmission).

FIG. 8 shows the frame structure type 2, particularly for a 5 ms switch-point periodicity, i.e. for TDD configurations 0, 1, 2 and 6.

FIG. 8 illustrates a radio frame, being 10 ms in length, and the corresponding two half-frames of 5 ms each. The radio frame consists of 10 subframes with each 1 ms, where each of the subframes is assigned the type of uplink, downlink or special, as defined by one of the Uplink-downlink configurations according to the table of FIG. 7.

As can be appreciated from FIG. 7, subframe #1 is always a Special subframe, and subframe #6 is a Special subframe for TDD configurations 0, 1, 2 and 6; for TDD configurations 3, 4 and 5, subframe #6 is destined for downlink. Special subframes include three fields: DwPTS (Downlink Pilot Time Slot), the GP (Guard Period) and UpPTS (Uplink Pilot Time Slot). The following Table shows information on the special subframe and in particular lists the lengths of DwPTS (Downlink Pilot Time Slot), the GP (Guard Period) and of UpPTS (Uplink Pilot Time Slot) as a multiple of the sample time $T_s=(1/30720)$ ms as defined for 3GPP LTE Release 11.

TABLE special subframe configurations, Frame Structure Type 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The TDD configuration applied in the system has an impact on many operations performed at the mobile station and base station, such as radio resource management (RRM) measurements, channel state information (CSI) measurements, channel estimations, PDCCH detection and HARQ timings.

In particular, the UE reads the system information to learn about the TDD configuration in its current cell, i.e. which subframe to monitor for measurement, for CSI measure and report, for time domain filtering to get channel estimation, for PDCCH detection, or for UL/DL ACK/NACK feedback.

Hybrid ARQ Schemes

A common technique for error detection and correction in packet transmission systems over unreliable channels is called hybrid Automatic Repeat request (HARQ), which is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet. Generally (and throughout this document) the transmission of additional information is called "retransmission (of a packet)", although this retransmission does not necessarily mean a transmission of the same encoded information, but could also mean the transmission of any information belonging to the packet (e.g. additional redundancy information).

Depending on the information (generally code-bits/symbols), of which the transmission is composed, and depending on how the receiver processes the information, the following Hybrid ARQ schemes are defined: Type I, Type II and Type III HARQ.

Synchronous HARQ means that the re-transmissions of HARQ blocks occur at pre-defined periodic intervals. Hence, no explicit signaling is required to indicate to the receiver the retransmission schedule. Asynchronous HARQ offers the flexibility of scheduling re-transmissions based on air interface conditions. In this case some identification of the HARQ process needs to be signaled in order to allow for a correct combining and protocol operation. In 3GPP LTE systems, HARQ operations with eight processes are used.

The HARQ protocol operation for downlink data transmission will be similar or even identical to HSDPA.

In uplink HARQ protocol operation there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions). In case of a synchronous non-adaptive retransmission the retransmission will use the same parameters as the previous uplink transmission, i.e. the retransmission will be signaled on the same physical channel resources, respectively uses the same modulation scheme/transport format.

Since synchronous adaptive retransmissions are explicitly scheduled via PDCCH, the eNodeB has the possibility to change certain parameters for the retransmission. It should be noted that the HARQ feedback (ACK/NACK) and PDCCH signaling occurs at the same timing. Therefore the user equipment only needs to check once whether a synchronous non-adaptive retransmission is triggered (i.e. only a NACK is received) or whether eNode B requests a synchronous adaptive retransmission (i.e. PDCCH is signaled).

HARQ and Control Signaling for TDD Operation

As explained above, transmission of downlink or uplink data with HARQ requires that an ACKnowledgement ACK or Negative ACK be sent in the opposite direction to inform the transmitting side of the success or failure of the packet reception.

In case of FDD operation, acknowledgement indicators related to data transmission in a subframe n are transmitted in the opposite direction during subframe n+4, such that a one-to-one synchronous mapping exists between the instant at which the transport is transmitted and its corresponding acknowledgment.

However, in the case of TDD operation, subframes are designated on a cell-specific basis as uplink or downlink or special (see previous chapter), thereby constraining the times at which resource grants, data transmissions, acknowledgments and retransmissions can be sent in their respective directions. The LTE design for TDD therefore supports grouped ACK/NACK transmission to carry multiple acknowledgements within one subframe.

For uplink HARQ, the sending (in one downlink subframe) of multiple acknowledgements on the Physical Hybrid ARQ Indicator CHannel (PHICH) is not problematic since, when viewed from the eNodeB, this is not significantly different from the case in which single acknowledgements are sent simultaneously to multiple UEs. However, for downlink HARQ, if the asymmetry is downlink-biased, the uplink control signaling (PUCCH) formats of FDD are insufficient to carry the additional ACK/NACK information. Each of the TDD subframe configurations in LTE (see below, and FIG. 7) has its own such mapping predefined between downlink and uplink subframes for HARQ purposes, with the mapping being designed to achieve a balance between minimization of acknowledgment delay and an even distribution of ACK/NACKs across the available uplink subframes. Further details are provided in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 7.3 incorporated herewith by reference.

Small Cells

Explosive demands for mobile data are driving changes in how mobile operators will need to respond to the challenging requirements of higher capacity and improved Quality of user Experience (QoE). Currently, fourth generation wireless access systems using Long Term Evolution (LTE) are being deployed by many operators worldwide in order to offer faster access with lower latency and more efficiency than 3G/3.5G system. Nevertheless, the anticipated future traffic growth is so tremendous that there is a vastly increased need for further network densification to handle the capacity requirements, particularly in high traffic areas (hot spot areas) that generate the highest volume of traffic. Network densification—increasing the number of network nodes, thereby bringing them physically closer to the user terminals—is a key to improving traffic capacity and extending the achievable user-data rates of a wireless communication system.

In addition to straightforward densification of a macro deployment, network densification can be achieved by the deployment of complementary low-power nodes respectively small cells under the coverage of an existing macro-node layer. In such a heterogeneous deployment, the low-power nodes provide very high traffic capacity and very high user throughput locally, for example in indoor and outdoor hotspot positions. Meanwhile, the macro layer ensures service availability and QoE over the entire coverage area. In other words, the layer containing the low-power nodes can also be referred to as providing local-area access, in contrast to the wide-area-covering macro layer.

The installation of low-power nodes respectively small cells as well as heterogeneous deployments has been possible since the first release of LTE. In this regard, a number of solutions have been specified in recent releases of LTE (i.e., Release-10/11). More specifically, these releases introduced additional tools to handle inter-layer interference in heterogeneous deployments. In order to further optimize performance and provide cost/energy-efficient operation, small cells require further enhancements and in many cases need to interact with or complement existing macro cells. Such solutions will be investigated during the further evolution of LTE—Release 12 and beyond. In particular further enhancements related to low-power nodes and heterogeneous deployments will be considered under the umbrella of the new Rel-12 study item (SI) "Study on Small Cell Enhancements for E-UTRA and E-UTRAN". Some of these activities will focus on achieving an even higher degree of interworking between the macro and low-power layers, including different forms of macro assistance to the low-power layer and dual-layer connectivity. Dual connectivity implies that the device has simultaneous connections to both macro and low-power layers.

Some deployment scenarios assumed in this study item on small cell enhancements will be discussed below. In the following scenarios, the backhaul technologies categorized as non-ideal backhaul in TR 36.932 [3] are assumed. Fibre access which can be used to deploy Remote Radio Heads (RRHs) is not assumed in this study. HeNBs are not precluded, but not distinguished from Pico eNBs in terms of deployment scenarios and challenges even though the transmission power of HeNBs is lower than that of Pico eNBs. The following 3 scenarios are considered.

Scenario #1

Scenario #1 is illustrated in FIG. 9 and is the deployment scenario where macro and small cells on the same carrier frequency (intra-frequency) are connected via a non-ideal backhaul. User are distributed both for outdoor and indoor.

Scenario #2

Scenario #2 is illustrated in FIGS. 10 and 11 and refers to a deployment scenario where macro and small cells on different carrier frequencies (inter-frequency) are connected via a non-ideal backhaul. User are distributed both for outdoor and indoor. There are essentially two different scenarios #2, referred herein as 2a and 2b, the difference being that in scenario 2b an indoor small cell deployment is considered.

Scenario #3 is illustrated in FIG. 12 and refers to a deployment scenario where only small cells on one or more carrier frequencies are connected via a non-ideal backhaul link.

Depending on the deployment scenario, different challenges/problems exist which need to be further investigated. During the study item phase such challenges have been identified for the corresponding deployment scenarios and captured in TS 36.842; more details on those challenges/problems can be found there.

In order to resolve the identified challenges which are described in section 5 of TS36.842, the following design goals are taken into account for this study in addition to the requirements specified in TR 36.932.

In terms of mobility robustness:
  For UEs in RRC_CONNECTED, Mobility performance achieved by small cell deployments should be comparable with that of a macro-only network.
In terms of increased signaling load due to frequent handover:
  Any new solutions should not result in excessive increase of signaling load towards the Core Network. However, additional signaling and user plane traffic load caused by small cell enhancements should also be taken into account.
In terms of improving per-user throughput and system capacity:
  Utilising radio resources across macro and small cells in order to achieve per-user throughput and system capacity similar to ideal backhaul deployments while taking into account QoS requirements should be targeted.

Dual Connectivity

One promising solution to the problems which are currently under discussion in 3GPP RAN working groups is the so-called "dual connectivity" concept. The term "dual connectivity" is used to refer to an operation where a given UE consumes radio resources provided by at least two different network nodes connected with a non-ideal backhaul. Essentially, the UE is connected with both a macro cell (macro eNB) and small cell (secondary or small eNB). Furthermore, each eNB involved in dual connectivity for a UE may assume different roles. Those roles do not necessarily depend on the eNB's power class and can vary among UEs.

Since the study Item is currently at a very early stage, details on the dual connectivity are not decided yet. For example the architecture has not been agreed on yet. Therefore, many issues/details, e.g. protocol enhancements, are still open currently. FIG. 13 shows an exemplary architecture for dual connectivity. It should be only understood as one potential option; the invention is not limited to this specific network/protocol architecture but can be applied generally. The following assumptions on the architecture are made here:
  Per bearer level decision where to serve each packet, C/U plane split
    As an example UE RRC signalling and high QoS data such as VoLTE can be served by the Macro cell, while best effort data is offloaded to the small cell.
  No coupling between bearers, so no common PDCP or RLC required between the Macro cell and small cell
  Looser coordination between RAN nodes
  SeNB has no connection to S-GW, i.e. packets are forwarded by MeNB
  Small Cell is transparent to CN.

Regarding the last two bullet points, it should be noted that it's also possible that SeNB is connected directly with the S-GW, i.e. S1-U is between S-GW and SeNB. Essentially there are three different options w.r.t the bearer mapping/splitting:
  Option 1: S1-U also terminates in SeNB; depicted in FIG. 14a
  Option 2: S1-U terminates in MeNB, no bearer split in RAN; depicted in FIG. 14b
  Option 3: S1-U terminates in MeNB, bearer split in RAN; depicted in FIG. 14c FIG. 14a-c depict those three options taking the downlink direction for the U-Plane data as an example. For explanation purpose, option 2 is mainly assumed for this application, and is the basis for FIG. 13 too.

Shortcomings of Dual Connectivity for Uplink

As explained above, the main idea of the dual connectivity concept is that a UE is communicating to both the MeNB and at least one SeNB. The usage of radio resources from both links offers the opportunity to increase the capacity/throughput.

Even though details of the dual connectivity are not decided yet (as mentioned before), it may assumed that UE has the possibility to listen and/or transmit on multiple frequencies simultaneously. For example, dual UL transmission has an advantage of achieving higher peak throughput by simultaneously transmitting on multiple CCs in one TTI (e.g. subframe).

However, especially for the uplink direction there would be some challenging issues to be resolved, e.g. inter-modulation distortion (IMD) caused by simultaneous transmission on multiple CCs. For some band combinations, if IM products occur in the spectrum range of the other system, IMD has to be suppressed somehow. To overcome such mentioned issues, an additional insertion loss could be introduced, e.g. additional RF filter is inserted into UE RF components. However, this additional insertion loss would essentially shrink the UL coverage even for the case that UE is configured only with one carrier. As another alternative countermeasure, power reduction for the case of simultaneous transmission was mentioned. Essentially, additional power reduction like P-MPR or A-MPR is applied if UE transmits on multiple CCs in a TTI simultaneously. However, with this alternative the additional power reduction will also shrink the UL coverage of the area where UE can simultaneously transmits on 2 CCs. In addition, it was no so clear whether this solution would resolve some issues, e.g. blocking, on simultaneous transmission.

Considering the described complexity from UE RF point of view and also from baseband point of view, for support of dual Uplink Transmissions it would be quite likely that especially low end category UEs (probably be being, at least at the beginning, more numerous than more expensive ones) would not support dual uplink transmission.

Also, it should be kept in mind that the amount of different band combinations for carrier-aggregation-capable UEs are increasing all the time as new bands and band combinations are being acquired by operators around the world. Considering this excessive amount of different band combinations, it seems quite unlikely that a single UE could support all different small cell deployment band combinations.

Therefore, solutions for small cell deployments need to be designed in a way that also UEs which do not support dual Rx or dual Tx could get gains and thus benefit from dual connectivity support.

SUMMARY OF THE INVENTION

One object of the invention is to provide an improved method for uplink communication benefiting from the above-mentioned dual connectivity.

The object is solved by the subject matter of the independent claims. Advantageous embodiments are subject to the dependent claims.

For a first aspect of the invention, it is assumed that the mobile station is connected to both a first and second base station, e.g. a base station of a macro cell and a base station of a small cell; i.e. dual connectivity. It is further assumed that the mobile station is not capable to support dual uplink transmissions, i.e. simultaneous transmissions to both base stations in the same subframe (TTI). According to the first aspect of the invention, the uplink transmissions of the mobile station to the first and second base station are coordinated in the time domain such that the mobile station can communicate with both base stations. The subframes of the radio frames are to be configured for uplink communication in a way allowing the mobile station to communicate with both base stations at particular subframes.

In more detail, an uplink transmission pattern is generated so as to define which subframes are usable by the mobile station for uplink communication with which base station, e.g. one subframe is defined to be usable for uplink communication from the mobile station to the first base station, but not to the second base station; conversely, another subframe is then defined to be usable for uplink communications from the mobile station to the second base station, but not to the first base station; furthermore, the subframe between the subframe for communication with one base station and the subframe for communication with the other base station (termed switching subframe) is not fully usable for either uplink communication to the first and second base station, since time is needed to switch the transmitter from one communication link (frequency) to the other communication link (frequency). Correspondingly, the uplink transmission pattern defines for each of a predetermined number of subframes a particular sequence of subframes, each subframe of the sequence of subframes being either usable for uplink communication to the first or second base station, or usable for switching between the communication links (frequencies). The mobile station, as well as the two base stations, need to be informed on the uplink transmission pattern such that a common understanding of uplink communication is ensured. In view of that the uplink transmission pattern only refers to few subframes, the mobile stations and base station apply same repeatedly so as allow continuous uplink communication.

The mobile station may be informed by a single uplink transmission pattern message, which indicates the usable type for each subframe and for both communication links with the same uplink transmission pattern. In particular, the single uplink transmission pattern message allows to differentiate between the three types of subframes. Alternatively, the mobile station may be configured with two uplink transmission patterns, one for each communication link, and indicating only those subframes usable for the uplink communication via the respective communication link; e.g. the uplink transmission pattern for the first/second communication link only indicates the subframes which are usable for uplink communication via the first/second communication link to the first/second base station. The mobile station may then determine the switching subframes from the two transmission patterns.

Similar to the uplink transmission pattern, the mobile station needs to also perform downlink communication with both base stations, which may be done simultaneously in the same subframe only in case the mobile station is capable of dual reception. Furthermore, for the first aspect it is assumed that the mobile station may or may not be capable of dual reception. Also, even in case the mobile station would be capable of dual reception, it is still possible that the mobile station is configured e.g. by one base station to not support dual reception; i.e. to communicate as if it would not be capable of dual reception.

Accordingly, in addition to being informed about the uplink transmission pattern applicable to uplink communications with the two base stations, the mobile station may also be informed about whether it should actually support or not dual reception, independent from its capability; the mobile station thus may receive a reception configuration indication with said information.

A downlink reception pattern is to be determined for coordinating the downlink communication between the mobile station and the two base stations. The downlink reception pattern of course depends on whether or not the mobile station is configured (by the reception configuration indication) to support dual reception or not. Correspondingly, the downlink reception pattern is determined based on whether the mobile station is configured to support dual reception or not; further, the downlink reception pattern is determined based on the uplink transmission pattern.

In case the mobile station supports dual reception, all subframes can be used for receiving a downlink transfer from both base stations. On the other hand, in case the mobile station does not support dual reception, the available subframes have to be distributed for either downlink communications from the first base station, downlink communications from the second base station or for switching the downlink reception between the two communication links respectively to the first and second base station. In particular, the uplink transmission pattern for the mobile station is basically shifted ahead by 4 subframes to arrive at the downlink reception pattern, wherein a subframe usable for an uplink transmission to the respective base station is turned into a subframe usable for a downlink reception from the respective base station.

In other words, in case a subframe n of the uplink transmission pattern is defined to be usable for an uplink transmission via the first communication link to the first base station, then, subframe n−4 of the downlink reception pattern is determined to be usable for a downlink reception via the first communication link from the first base station; in case a subframe n of the uplink transmission pattern is defined to be usable for an uplink transmission via the second communication link to the second base station, then, subframe n−4 of the downlink reception pattern is determined to be usable for a downlink reception via the second communication link from the second base station; in case a subframe n of the uplink transmission pattern is defined to be usable for switching the uplink communication between the first and second communication links, then, subframe n−4 of the downlink reception pattern is determined to be usable for switching the downlink communication between the first and second communication links.

The reason behind the shifting ahead by 4 subframes is the grant timing as standardized by 3GPP, which defines that PUSCH grants are received in a subframe n−4 that is 4 subframes ahead of the subframe n to which the PUSCH grant refers.

The downlink reception pattern may be derived from the uplink transmission pattern separately by the three entities; mobile station and first and second base station (provided the particular base station knows the uplink transmission pattern and the configuration for dual reception of the mobile station). Alternatively of course, the entity(ies) may be informed by the one station determining the downlink reception pattern.

In any case, the three communication entities need to know the downlink reception pattern as well as the uplink transmission pattern to be used by the mobile station for communication in uplink and downlink with the two base stations.

Moreover, a retransmission protocol (e.g. HARQ) is employed by the mobile station in the uplink as well as in the downlink separately, and respectively also for both communication links to the first/second base station separately. As explained in the background section, acknowledgements (ACK) and non-acknowledgements (NACK) are transmitted by the receiving entity to trigger re-transmissions of incorrectly received/lost data on a subframe basis. The HARQ protocol should also be applied for dual connectivity, and especially in case where the mobile station does not support dual uplink.

In the case where the mobile station does neither support dual reception nor dual uplink, the HARQ protocol operation for downlink transmissions is simple, since for each downlink transmission, according to the downlink reception pattern, the corresponding available uplink transmission 4 subframes in the future can be used by the mobile station for transmitting the corresponding HARQ feedback. Similarly, in the case where the mobile station does support both dual reception as well as dual uplink, each subframe can be used for downlink and uplink, respectively for both communication links. Thus, for each downlink transmission in any subframe, a corresponding uplink transmission can be performed 4 subframes in the future so as to transport the HARQ feedback to the origin of the downlink transmission, be it the first or second base station.

On the other hand, in case the mobile station supports dual reception but does not support dual uplink, it is not possible to transmit for each possible downlink reception the corresponding HARQ feedback (ACK/NACK) in the uplink in the subframe 4 subframes after; there are only a limited amount of subframes available for uplink transmissions for a particular communication link. In this case, the HARQ feedback for downlink transmissions in several subframes is bundled/multiplexed and transmitted together in a corresponding subframe available for uplink. The bundling is defined such that the last subframe n−4 out of the various subframes that are bundled is 4 subframes ahead of the next subframe n that is available for an uplink transmission.

A further variant thereof includes that the possible bundling/multiplexing size is limited, such that the HARQ feedback for downlink transmissions of only a particular number of subframes can be multiplexed/bundled and transmitted in a single subframe available for uplink communication. The maximum multiplexing/bundling size can be set separately for the two communication links, thus can be different or the same. In any case, depending on the particular maximum multiplexed/bundling size, the HARQ feedback for downlink transmissions of some subframes may not be able to be sent in the uplink to the transmitter.

A second aspect of the invention solves the problems of the prior art, as explained above, differently from the first aspect of the invention. According to this second aspect, it is assumed that there are only a few actual collisions that can be then treated specifically without changing the further communication operation (as done for the first aspect of the invention where collisions are avoided from the beginning by coordinating the uplink transmissions to the two base stations in the time domain). A collision occurs between uplink transmissions from the mobile station to the first and second base station in the same subframe, since e.g. the schedulers of the first and second base station operate separately from one another and thus cannot coordinate the uplink transmissions so as to avoid scheduling an uplink transmission in the same subframe for the mobile station.

For this second aspect of the invention, in case of a pending collision of several uplink transmissions in the same subframe, one pending uplink transmission is prioritized over the other according to particular predetermined priority rules; thus, only one of the two uplink transmissions that were pending for the same subframe is actually performed, namely the one with the higher priority. The other uplink transmission that was not sent due to the collision, can be either discarded or transmitted in the next uplink transmission opportunity (provided no collision happens again).

The priority rules according to which collisions are handled and solved, can be based on various parameters and circumstances; only a few will be presented in this application, the skilled person is aware how to define other priority rules to properly handle the mentioned collision of uplink communications. Exemplary, the priority rules can depend on what data is transmitted by which base station; it is currently discussed, that the macro cell shall carry primarily RRC signaling and other delay-critical traffic, whereas the small cell shall carry most traffic due to the possible high data rates. Correspondingly, data transmitted from/to the macro eNodeB via the corresponding communication link could be generally assigned a higher priority order than the data transmitted from/to the small cell eNodeB. Consequently, in case of collision in a particular subframe, the mobile station will send the uplink transmission to the macro eNodeB in the relevant subframe, thus dropping the uplink transmission to the small eNodeB in the relevant subframe.

Other possible priority rules may refer for example to the category of the base stations, to the Quality of Service (QoS), to the Quality of Experience (QoE) or any combination of these or other parameters.

In case of a collision that causes one of the pending uplink transmissions to be dropped (or postponed), it would be beneficial if the corresponding recipient and scheduler are informed thereof, in view of that possible retransmissions for the two colliding uplink transmission could cause further collisions.

Furthermore, it is important to handle those cases where, although no "direct" collision occurs (i.e. two uplink transmissions pending for the same subframe), there may be an "indirect" collision where two uplink transmissions are pending for two directly subsequent subframes n and n+1. As already explained for the first aspect of the invention, it is necessary to switch the transmitter from one communication link (frequency) to the other communication link (frequency). Therefore, the mobile station can not transmit in the uplink at two subsequent subframes at different communication links (frequencies).

In said particular case, the mobile station may also apply the same principles as explained for the direct collision case, and may thus prioritize one uplink transmission over the other according to the predetermined priority rules. As a result, the mobile station will only send the uplink transmission with the higher priority order in the corresponding subframe, be it subframe n or n+1. The other uplink transmission with the lower priority order may be either dropped completely or may be performed at the next uplink communication opportunity.

A first embodiment of the invention provides a method for configuring a plurality of subframes in a mobile communication system for uplink and downlink. A mobile station is connected via a first communication link to a first base station and via a second communication link to a second base station. The mobile station receives an uplink transmission pattern and a reception configuration indication, which configures the mobile station to support or not support simultaneous reception of data from the first base station and the second base station within the same subframe. The received uplink transmission pattern includes information on a predetermined number of subframes defining which subframes are usable by the mobile station for uplink transmissions via the first communication link to the first base station, and/or which subframes are usable by the mobile station for uplink transmissions via the second communication link to the second base station and which subframes are usable by the mobile station for switching uplink communication between the first and the second communication link. The mobile station determines, based on the received uplink transmission pattern and on the received reception configuration indication, a downlink reception pattern defining which subframes are usable by the mobile station for downlink reception via the first communication link from the first base station, and/or which subframes are usable by the mobile station for downlink reception via the second communication link from the second base station and/or which subframes are usable by the mobile station for switching downlink communication between the first and the second communication link.

A second embodiment of the invention provides a method for coordinating uplink communication of a mobile station in a mobile communication system. The mobile station is connected via a first communication link to a first base station and via a second communication link to a second base station. Priority rules are determined for the first communication link and the second communication link. The mobile station determines whether uplink communication is to be performed to both the first base station and the second base station in the same subframe. In the positive case, the mobile station priorities uplink communication according to the priority rules such that only the uplink communication with the higher priority is performed in that subframe.

The first embodiment of the invention further provides a mobile station for configuring a plurality of subframes in a mobile communication system for uplink and downlink. The mobile station is connected via a first communication link to a first base station and via a second communication link to a second base station. A receiver of the mobile station receives an uplink transmission pattern and a reception configuration indication, which configures the mobile station to support or not support simultaneous reception of data from the first base station and the second base station within the same subframe. The received uplink transmission pattern includes information on a predetermined number of subframes defining which subframes are usable by the mobile station for uplink transmissions via the first communication link to the first base station, and/or which subframes are usable by the mobile station for uplink transmissions via the second communication link to the second base station and which subframes are usable by the mobile station for switching uplink communication between the first and the second communication link. A processor of the mobile station determines, based on the received uplink transmission pattern and on the received reception configuration indication, a downlink reception pattern defining which subframes are usable by the mobile station for downlink reception via the first communication link from the first base station, and/or which subframes are usable by the mobile station for downlink reception via the second communication link from the second base station and/or which subframes are usable by the mobile station for switching downlink communication between the first and the second communication link.

The second embodiment of the invention provides a mobile station for coordinating uplink communication of the mobile station in a mobile communication system. The mobile station is connected via a first communication link to a first base station and via a second communication link to a second base station. Priority rules are determined for the first communication link and the second communication link. A processor of the mobile station determines whether uplink communication is to be performed to both the first base station and the second base station in the same subframe. In the positive case, the mobile station prioritizes uplink communication according to the priority rules such that only the uplink communication with the higher priority is performed in that subframe.

The first embodiment furthermore provides a base station for configuring a plurality of subframes in a mobile communication system for uplink and downlink. A mobile station is connected via a first communication link to the base station and via a second communication link to a second base station. A processor of the base station determines an uplink transmission pattern, defining which subframes are usable by the mobile station for uplink transmissions via the first communication link to the first base station, and/or which subframes are usable by the mobile station for uplink transmissions via the second communication link to the second base station and which subframes are usable by the mobile station for switching uplink communication between the first and the second communication link. A transmitter of the base station transmits the determined uplink transmission pattern and a reception configuration indication to the mobile station, the reception configuration indication configuring the mobile station to support or not support simultaneous reception of data from the first base station and the second base station within the same subframe. The processor determines, based on the received uplink transmission pattern and on the received reception configuration indication, a downlink reception pattern defining which subframes are usable by the mobile station for downlink reception via the first communication link from the first base station, and/or which subframes are usable by the mobile station for downlink reception via the second communication link from the second base station and/or which subframes are usable by the mobile station for switching downlink communication between the first and the second communication link.

BRIEF DESCRIPTION OF THE FIGURES

In the following the invention is described in more detail with reference to the attached figures and drawings.

FIG. 21 illustrates the uplink transmission pattern as introduced by FIG. 15, expanded by the corresponding downlink reception pattern(s) that may be derived from the uplink transmission pattern, according to the first embodiment of the invention, FIG. 22 illustrates the uplink transmission pattern as introduced by FIG. 17, expanded by the corresponding downlink reception pattern that may be derived from the uplink transmission pattern, according to the first embodiment of the invention, FIG. 23 illustrates the uplink transmission pattern as introduced by FIG. 18, expanded by the corresponding downlink reception pattern that may be derived from the uplink transmission pattern, according to the first embodiment of the invention, FIG. 24 illustrates the uplink transmission pattern as introduced by FIG. 19, expanded by the corresponding downlink reception pattern that may be derived from the uplink transmission pattern, according to the first embodiment of the invention, FIG. 25 illustrates the uplink transmission pattern as introduced by FIG. 20, expanded by the corresponding downlink reception pattern that may be derived from the uplink transmission pattern, according to the first embodiment of the invention.

DETAILED DESCRIPTION OF THE INVENTION

Figure 1:
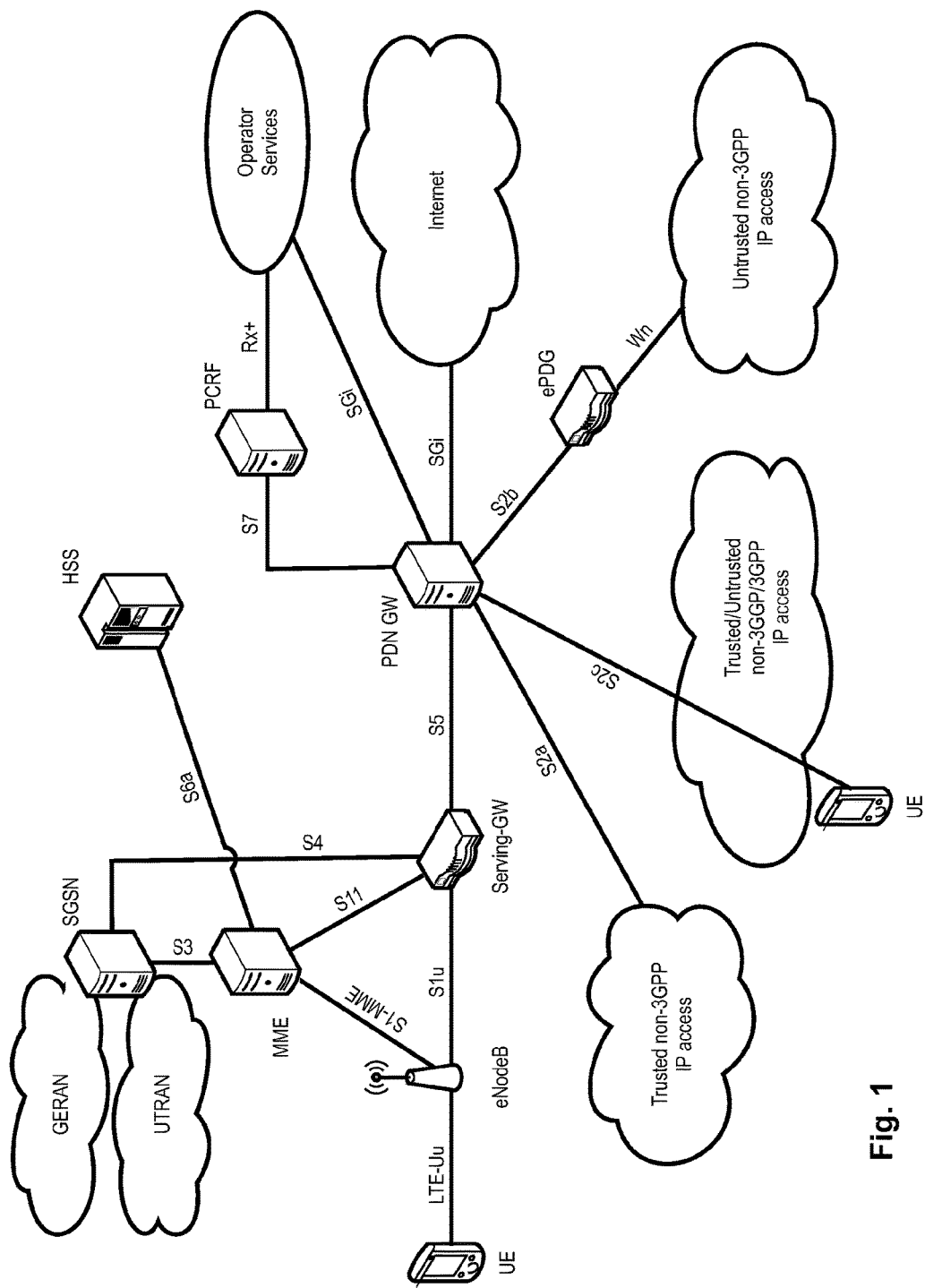
FIG. 1 shows an exemplary architecture of a 3GPP LTE system.
Figure 2:
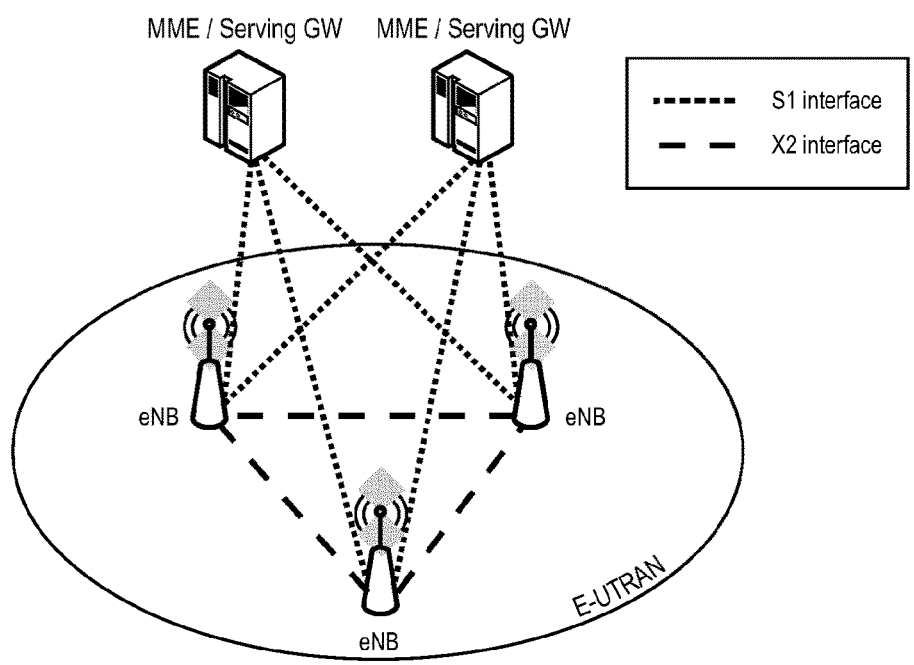
FIG. 2 shows an exemplary overview of the overall E-UTRAN architecture of 3GPP LTE.
Figure 3:
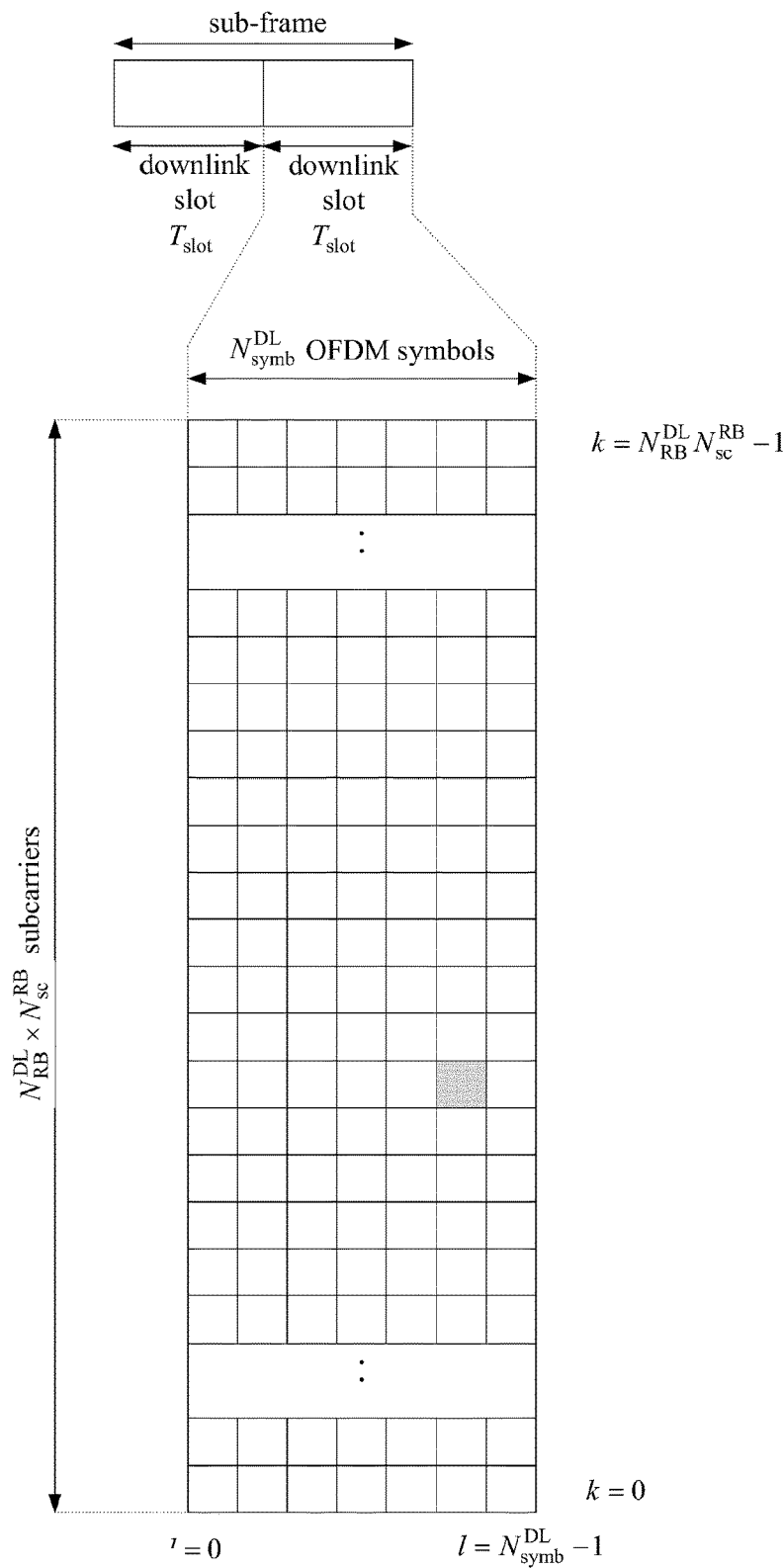
FIG. 3 shows exemplary subframe boundaries on a downlink component carrier as defined for 3GPP LTE (Release 8/9)
Figure 4:
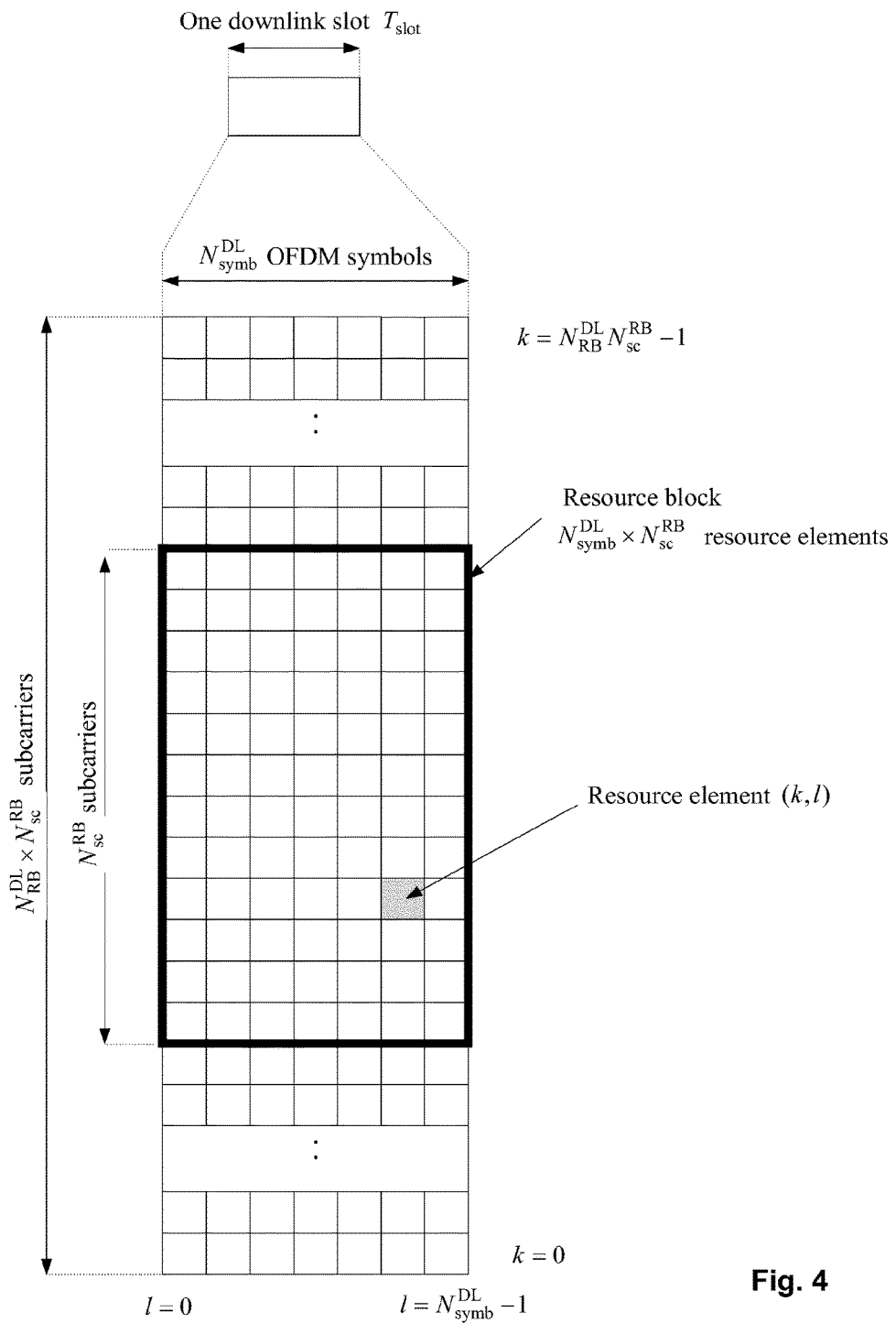
FIG. 4 shows an exemplary downlink resource grid of a downlink slot as defined for 3GPP LTE (Release 8/9)
Figure 5:
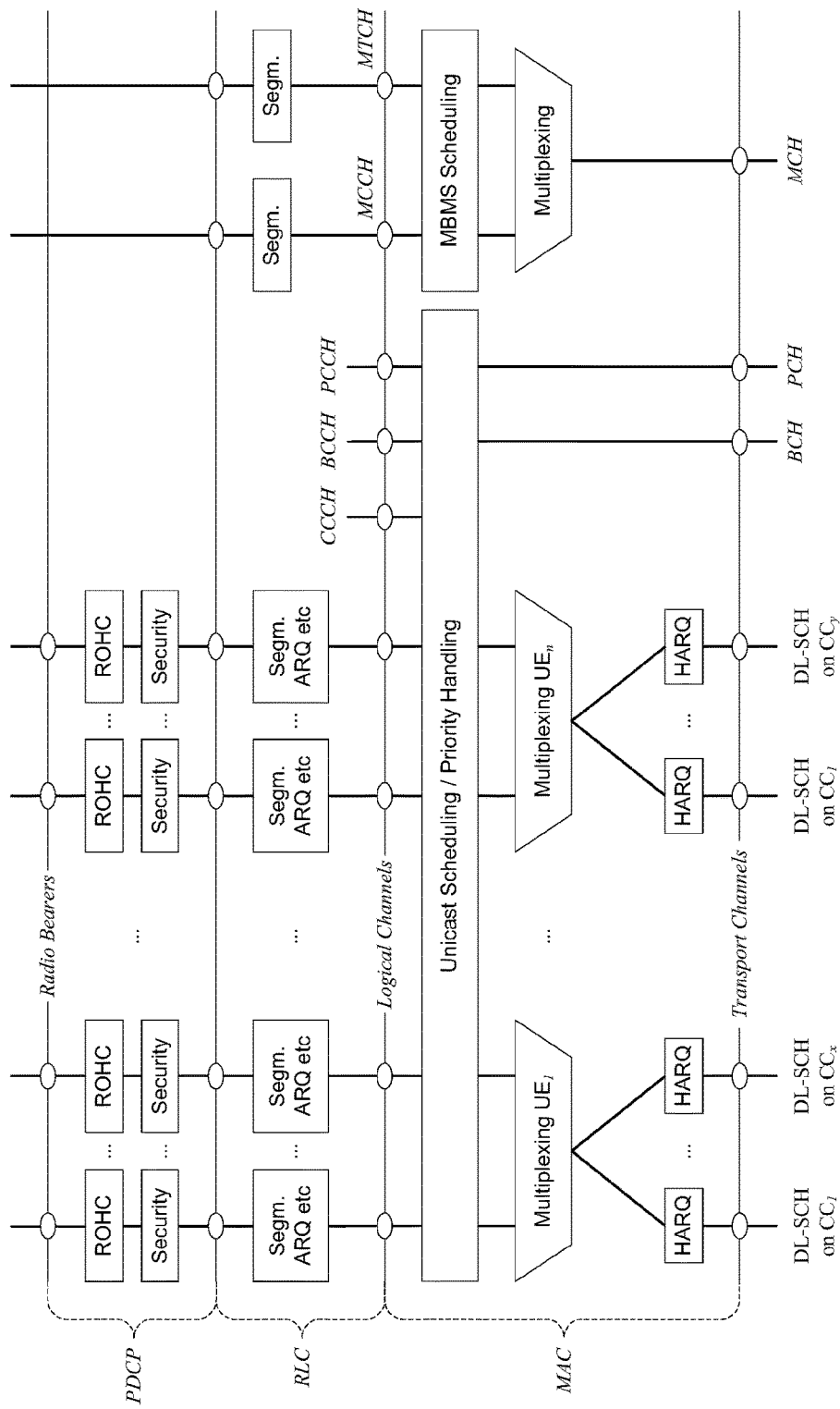
FIGS. 5 & 6 show the 3GPP LTE-A (Release 10) Layer 2 structure with activated carrier aggregation for the downlink and uplink, respectively.

The following paragraphs will describe various embodiments of the invention. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the invention may be advantageously used for example in a mobile communication system such as 3GPP LTE-A (Release 10/11/12) communication systems as described in the Technical Background section above, but the invention is not limited to its use in this particular exemplary communication networks.

A mobile station or mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The term "communication link" refers to a logical connection between two entities (in this application, mainly a mobile station and a base station) via which data can be exchanged.

The term "uplink communication" shall mainly refer to PUCCH and PUSCH transmissions. These may be either scheduled directly by the scheduler of the corresponding base station (e.g. Macro or Small eNB) using a grant message via the PDCCH; or may be configured otherwise, e.g. by a semi-persistent allocation. Also other periodic uplink transmissions, such as CQIs, BSRs and other signaling that does not need to be scheduled explicitly shall be covered by the term "uplink communication".

Similar to the term "uplink communication, the term "downlink communication" shall mainly refer to PDCCH and PDSCH transmissions, but shall broadly cover any downlink transmission.

The term "uplink transmission pattern" refers to information defining part or all of the subframes out of a particular sequence of subframes for uplink transmissions via a particular communication link. The uplink transmission pattern may refer to only one communication link, in which case the pattern can be expressed by using one bit per subframe, or may refer to more than one, e.g. all the relevant communication links, in which case the pattern can be expressed by using two bits per subframe to differentiate between the different component carriers and the interruption subframe.

The term "downlink reception pattern" is similar to the "uplink transmission pattern" and refers to information defining part or all of the subframes out of a particular sequence of subframes for downlink receptions via a particular communication link.

The term "reception configuration indication" refers to information allowing the mobile station to derive whether it shall support dual reception or not; even in case the mobile station would be able to support dual reception it can be configured to not use it.

The term "priority rules" refers to a predetermined set of rules defining priority relationships between different possible uplink communications that may collide in the same or adjacent subframes. The priority rules are such that, in case of collision between two uplink communications, it is possible to prioritize one uplink communication over the other uplink communication and to thus transmit only the uplink communication with the higher priority.

In the following, several embodiments of the invention will be explained in detail. The explanations should not be understood as limiting the invention, but as a mere example of the invention's embodiments to better understand the invention. A skilled person should be aware that the general principles of the invention as laid out in the claims can be applied to different scenarios and in ways that are not explicitly described herein. Correspondingly, the following scenarios assumed for explanatory purposes of the various embodiments shall not limit the invention as such.

First Embodiment

In the following a first set of embodiments of the invention will be explained. To simplify the illustration of the principles of the first embodiment, several assumptions are made; however, it should be noted that these assumptions should not be interpreted as limiting the scope of the present application, as broadly defined by the claims.

Figure 9:
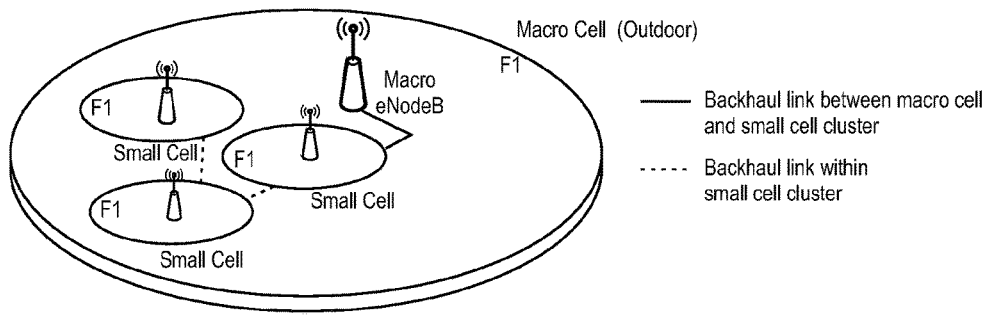
FIG. 9 illustrates a deployment scenario for small cell enhancement, where macro and small cells are on the same carrier frequency.
Figure 10:
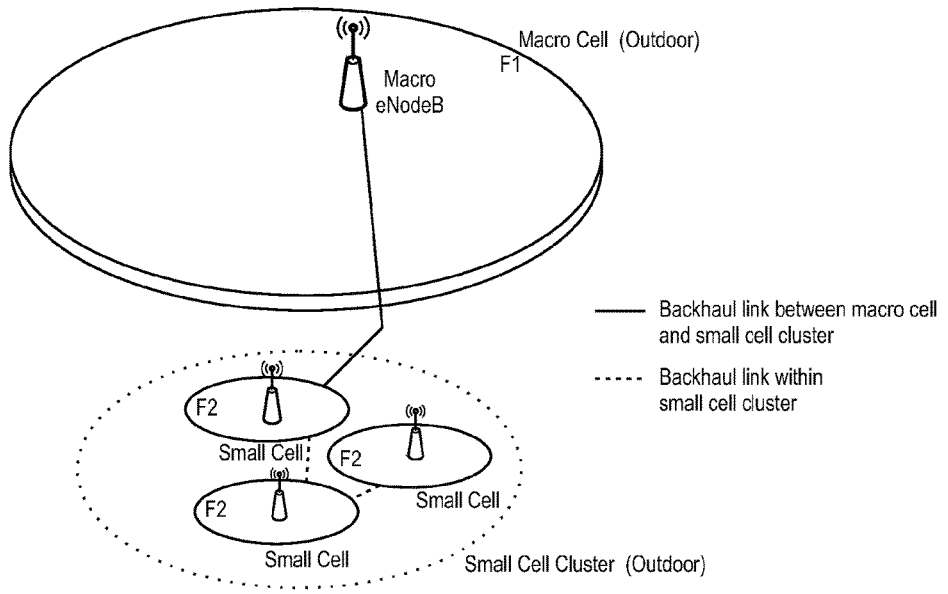
FIGS. 10 and 11 illustrate further deployment scenarios for small cell enhancement where macro and small cells are on different carrier frequencies, the small cell being respectively outdoor and indoor.
Figure 11:
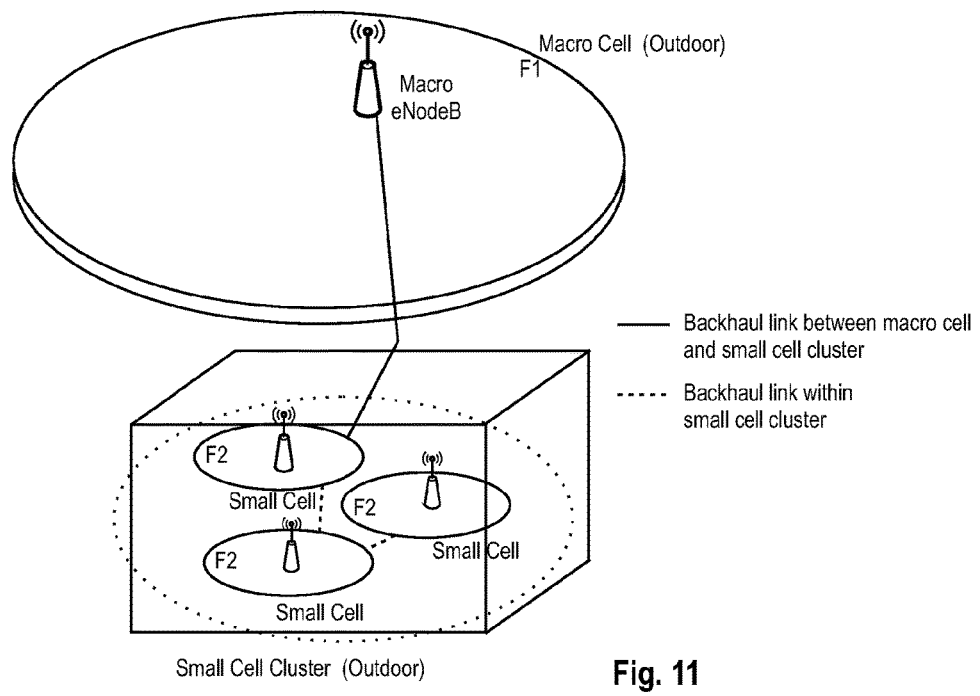
Figure 12:
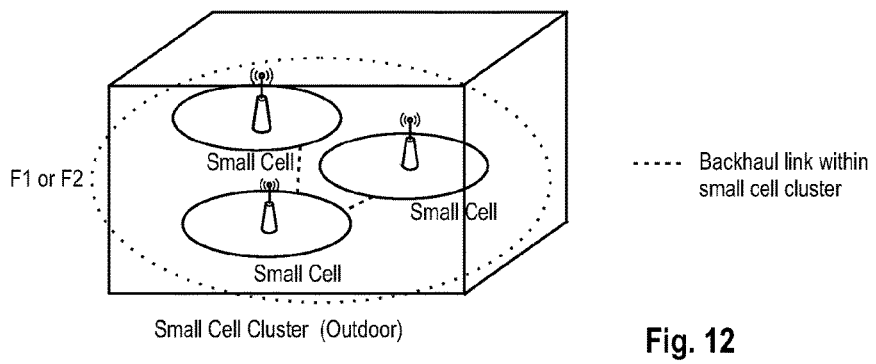
FIG. 12 illustrates a further deployment scenario for small cell enhancement with only small cells, FIG. 13 gives an overview of the communication system architecture for dual connectivity with macro and small eNBs connected to the core network, where the S1-U interface terminates in the Macro eNB and no bearer splitting is done in RAN.
Figure 13:
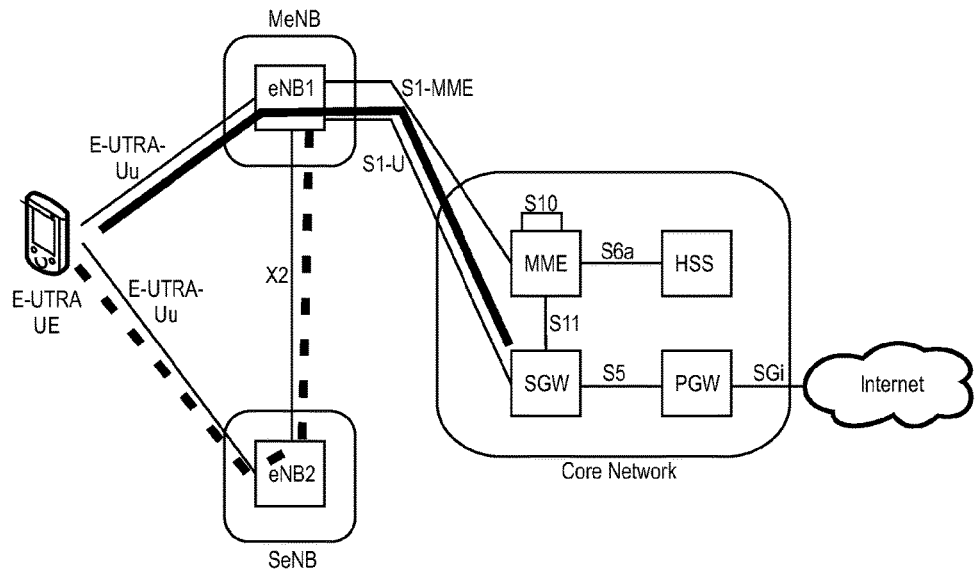
Figures 14A, 14B, 14C:
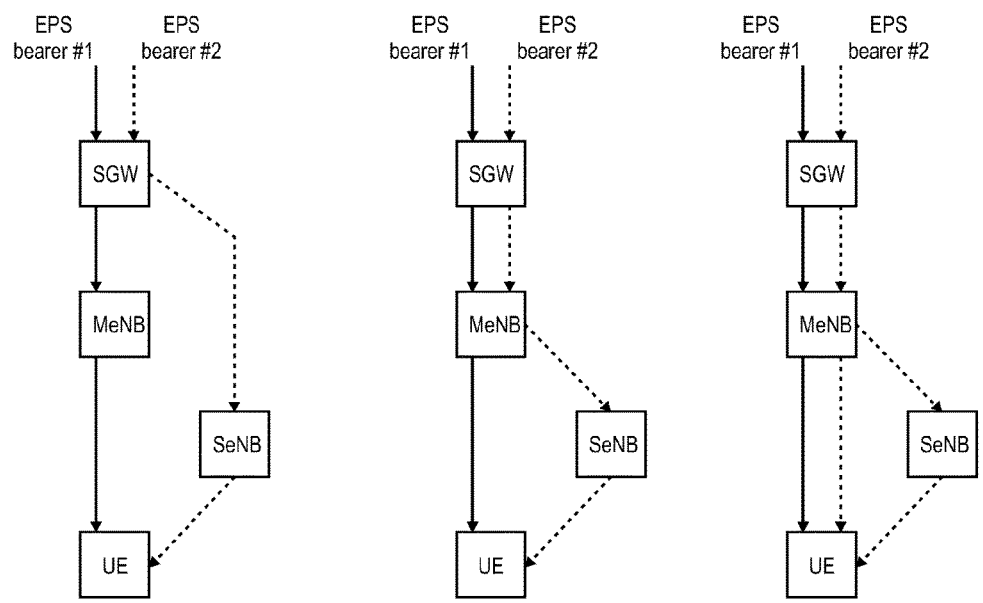
FIG. 14a-c illustrate the different options for having two separate EPS bearers between the SGW and the UE.

The small cell enhancement environment as explained in the background section is assumed, where at least one small cell and a macro cell are provided (see FIGS. 9 to 11). Furthermore, the configuration according to FIG. 14*b* is assumed for the most part of the explanation, where the traffic for the small cell is routed through the Macro eNodeB. However, the principles of the first embodiment are equably applicable to the other configurations of FIG. 14*a, c*.

Consequently, a scenario is assumed where the UE is connected to two base stations, a macro base station (MeNB) and a small base station (SeNB) via corresponding communication links on different frequencies. FDD is assumed for communications between the UE and the MeNB and SeNB, where downlink and uplink communication is performed at different frequencies.

For most of the explanations it will be assumed that the UE is not capable of, or at least is configured to not support, dual uplink communication; i.e. simultaneous transmissions of information in the uplink to both base station over the different communication links (frequencies) in a single subframe. The UE may or may not support dual reception, i.e. simultaneous reception of information in the downlink from both base stations over the different communication links (frequencies) in a single subframe.

As explained at the end of the background section, while UEs supporting dual uplink benefit in terms of throughput from the small cell enhancement scenario, UEs that are not capable, or are configured to not support, dual uplink, do not have these benefits. Also it is yet undefined how communication shall be handled efficiently for the UE to communicate with both the MeNB and the SeNB.

According to the first embodiment of the invention, the uplink transmissions from the UE to the MeNB and SeNB shall be coordinated in the time domain, such as time division multiplexing. In general, each subframe may be defined to be usable for an uplink transmission to the MeNB or the SeNB or for switching the uplink communication between the two communication links to the MeNB respectively SeNB. To said end, an uplink transmission pattern is determined, where the uplink transmission pattern defines for a number of subsequent subframes the "type" of each subframe; the type being either uplink to MeNB, uplink to SeNB or interruption/switching of the transmitter.

Figure 15:
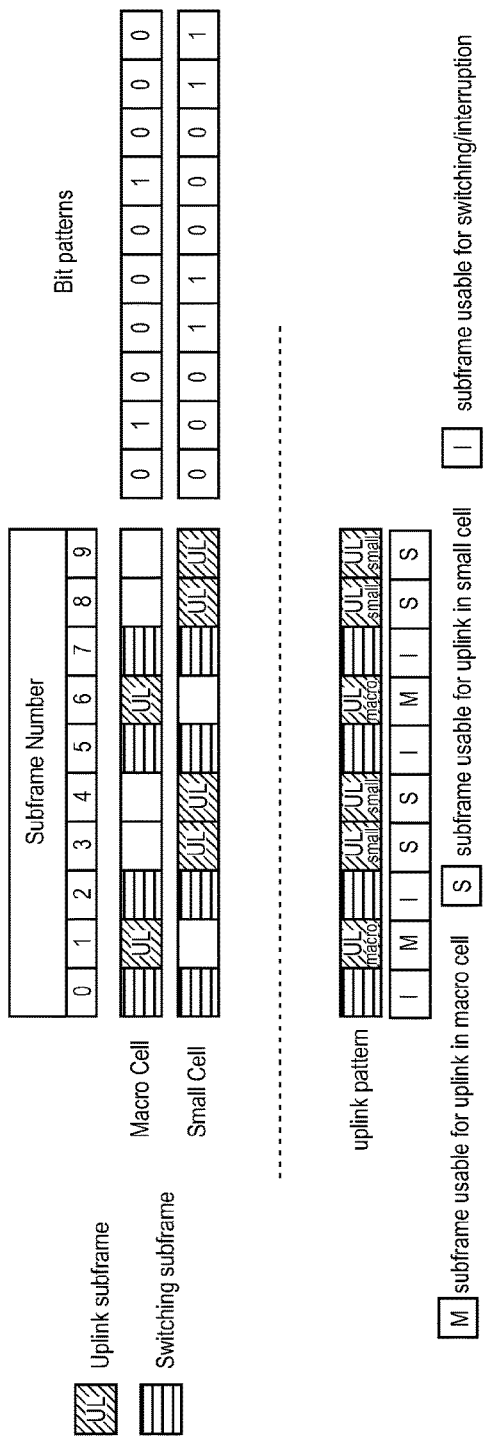
FIG. 15 illustrates an uplink transmission pattern of 10 subframes length to be used for the small cell and macro cell according to the first embodiment, additionally showing two 10-bit patterns, one for each cell, signaling the uplink transmission pattern, and alternativly showing a 10-entry pattern for commonly signaling the uplink transmission pattern for both cells, FIG. 16 illustrate the timing misalignment between the small cell and macro cell.

This will be explained with reference to FIG. 15, illustrating an uplink transmission pattern for 10 subframes 0-9, i.e. one radio frame. FIG. 15 illustrates differently-hashed boxes to differentiate between the different possible uses of a subframe. As can be seen from FIG. 15, the uplink transmission pattern defines for each subframe how it may be used by the mobile station to transmit uplink data to the base stations. FIG. 15 differentiates between the cases where the uplink transmission pattern is indicated by two different bit pattern messages (upper part and right part of FIG. 15) or by a single pattern message (lower part of FIG. 15). In the first case, each bit pattern refers to only one communication link, and thus merely needs to differentiate between a subframe usable for uplink communication via said particular communication link and a subframe not usable for uplink communication via said particular communication link; this may be done by one bit per subframe. The same applies to the uplink pattern for the other communication link. In combination it is possible to determine the type of every subframe, since subframes, that are neither usable for uplink via the first communication link (e.g. macro cell) nor via the second communication link (e.g. small cell), are determined to be usable for switching the uplink communication between one link and the other.

Figure 16:
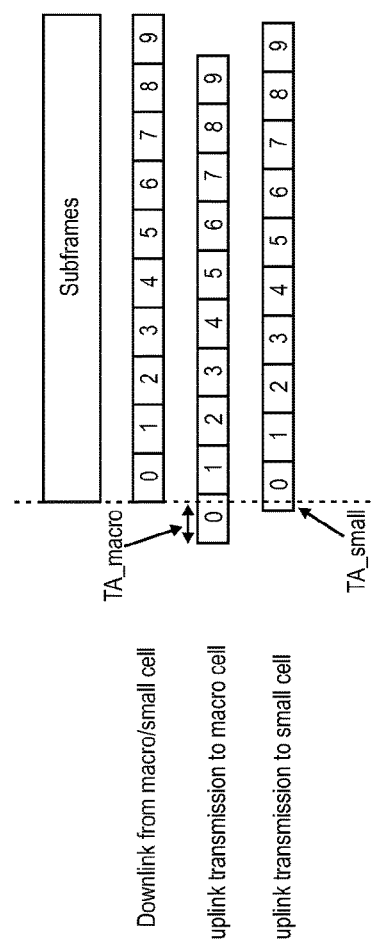

When switching between UL carriers (i.e. communication links) a switching time/interruption time needs to be considered. The radio frequency switching delay is in the order of 200-300 µs. In addition, when small cell and macro cell have a different uplink timing alignment, the different uplink timings need to be considered for the switching too, i.e. additional interruption time is needed for switching the uplink carrier. Different uplink timing alignments are illustrated in FIG. 16. Assuming Rel.10 timing requirements the Timing alignment (TA) difference between carriers could be in the order of 31.3 µs. Since it is not possible to switch uplink transmissions on a TTI basis, interruption time for the switching needs to be considered.

Even though the complete switching time requires only around 350 µs, for simplicity of the first aspect, the interruption time is considered 1 ms, i.e. one subframe. Nevertheless, the mobile station may use the remaining part of the "switching subframe", i.e. around 650 µs for other uplink activities like transmission on other Radio Access Technologies or some discovery signal transmission or other procedures.

Returning to FIG. 15, an exemplary pattern is depicted for both communication links, where an uplink transmission pattern with an exemplary length of 10 subframes is taken as an example. As apparent, the uplink transmission pattern defines subframes 1 and 6 to be usable for uplink communication to the MeNB at a first frequency, subframes 3, 4, 8 and 9 to be usable for uplink communication to the SeNB at a second frequency, and the intermediate subframes 0, 2, 5 and 7 to be usable for switching the uplink communication between the two different frequencies of the two communication links.

Figure 17:
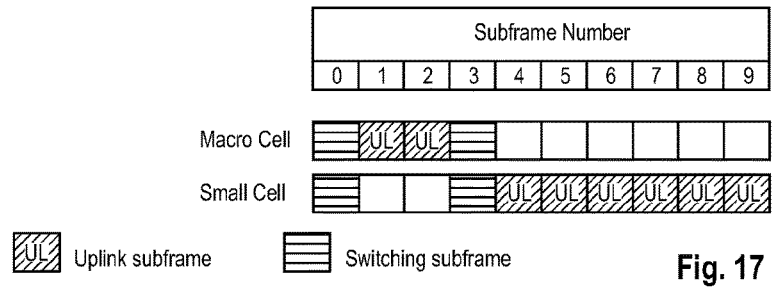
FIG. 17-20 illustrate different uplink transmission patterns to be used for the small cell and the macro cell according to the first embodiment.
Figure 18:
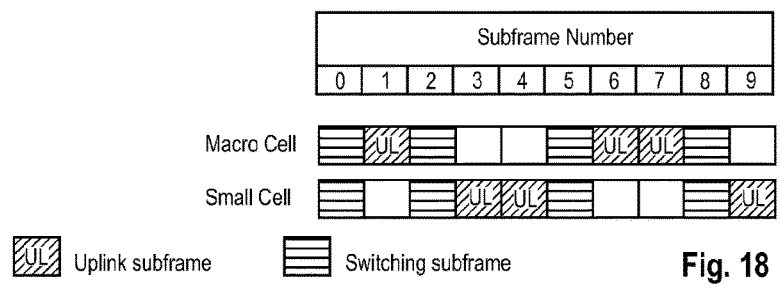

As mentioned, the particular pattern depicted in FIG. 15 is a mere example, and the uplink transmission pattern can take many other forms, such as those depicted in FIGS. 17 and 18. FIGS. 17 and 18 also assume the exemplary length of 10 subframes for the uplink transmission pattern, but define a different sequence of the uplink transmission subframes. For example, the uplink transmission pattern of FIG. 17 also defines two subframes as usable for uplink transmissions to the MeNB (as in FIG. 15), however defines these subframes as being directly adjacent, i.e. subframes 1 and 2. This has the advantage that the necessity for switching between the communication links is reduced compared to FIG. 15; whereas the uplink transmission pattern of FIG. 15 needs four subframes for switching purposes, the uplink transmission pattern of FIG. 17 only defines two subframes for switching purposes. Therefore, more subframes can be used for actual uplink transmissions in the small cell to the SeNB (two more subframes). The disadvantage is that uplink opportunities especially for the macro cell are centered at the beginning of each radio frame, such that the flexibility for scheduling and respectively configuring uplink transmissions for the macro cell is reduced.

For both uplink transmission patterns of FIG. 15 and FIG. 17, more uplink transmission subframes are defined for the small cell, since it is assumed that the small cell will carry significantly more traffic than the macro cell. The uplink transmission pattern of FIG. 18 on the other hand allows the same amount of uplink subframes for the small cell and the macro cell; three for each communication link, while the remaining four subframes need to be used in this particular example for switching the uplink transmitters from the frequency of one communication link to the frequency of the other communication link.

Figure 19:
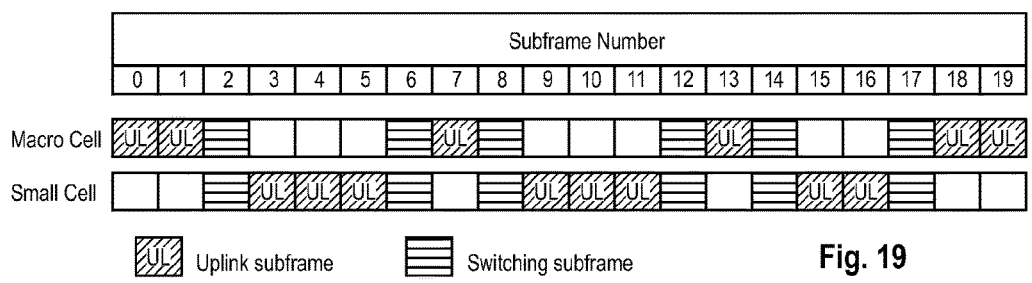

The exemplary uplink transmission pattern of FIG. 19 assumes a length of 20 subframes, i.e. two radio frames, and defines a particular sequence of subframes usable for uplink communication to the MeNB, or the SeNB or for switching between uplink communication to the MeNB and SeNB. Six out of the 20 total subframes of the uplink transmission pattern are defined to be usable for uplink communications to the MeNB and are distributed as illustrated by FIG. 19 to subframes 0, 1, 7, 13, 18 and 19. Eight out of the 20 total subframes of the uplink transmission pattern are defined to be usable for uplink communications to the SeNB and are distributed as illustrated by FIG. 19 to subframes 3-5, 9-11, 15 and 16. Six subframes (2, 6, 7, 12 14 and 17) are necessary to allow switching between the different frequencies of the uplink communication links.

Figure 20:
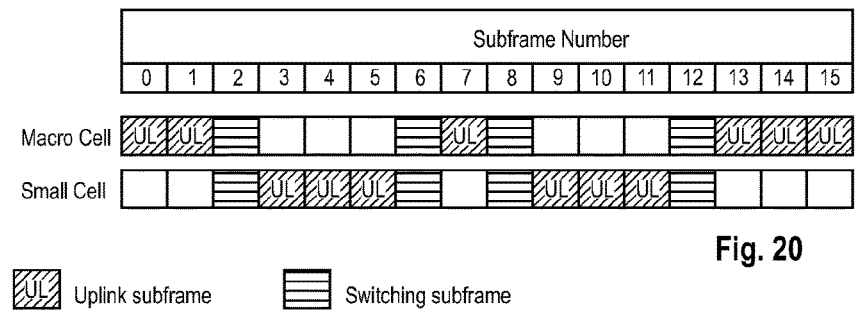

FIG. 20 illustrates a further exemplary uplink transmission pattern and assumes a length of 16 subframes in total. Again the particular definition of which subframe is usable for what is exemplary, and can be defined entirely different.

In summary, the length (in subframes) of an uplink transmission pattern is flexible, as well as the number of subframes available to uplink communications via a communication link, as well as the particular definition of the usability of the subframes of the uplink transmission pattern and can be determined in many different ways. It is not important for the present invention how exactly the uplink transmission pattern is defined the way it is; the entity determined same may consider various different aspects such as the amount of data being exchanged on the respective macro/small cells and other parameters. It is important however to provide a switching subframe in between two subframes usable for uplink communication via different communication links (frequencies).

In any case, the defined uplink transmission pattern is then used repeatedly for an ongoing communication. For example, the uplink transmission pattern of FIG. 15 is used for every radio frame, such that the communication of the mobile station is continuously based on said pattern.

Of course the communication partners, in this case MeNB, SeNB and UE, need to agree on the same uplink transmission pattern, and thus should be informed accordingly. This may be done by the entity determining the uplink transmission pattern(s) in the first place; e.g. the MeNB or SeNB or any network entity responsible in said respect. The uplink transmission pattern can for example be determined as part of the RRM (radio resource management) algorithm; where one eNB decides the patterns for both links. For example, the MeNB could receive and then consider relevant information provided by the SeNB.

In the following, it is assumed that the MeNB is responsible for determining the uplink transmission pattern for both communication links. Correspondingly, the MeNB should inform the SeNB and the UE about the determined uplink transmission pattern. This may be done in many different ways.

The MeNB might transmit a corresponding message over the Xn interface to the SeNB, and via the E-UTRA-Uu interface to the UE. The corresponding message may include one common uplink transmission pattern which indicates the subframe usage for both communication links (lower part of FIG. 15). Alternatively it may include one uplink transmission pattern for each communication link (upper right part of FIG. 15). As depicted, each bit of the 10-bit pattern corresponds to a subframe.

This may be done by higher layer signaling, like MAC or RRC signaling, similar to other configuration messages in LTE; e.g. the RRC reconfiguration message might be re-used and extended appropriately (RRC configuration message being defined in TS 36.331). As an alternative, also physical layer signaling could be used, having the advantage that there is a clear activation time given by the PHY signaling when the UE applies the uplink transmission configuration.

Additionally, the uplink transmission pattern might be changed during communication, e.g. if another uplink transmission pattern turns out to be more beneficial for some reason. In this case a new uplink transmission pattern may be determined and applied by all entities.

The UE also needs to communicate with both of the base stations in the downlink, i.e. receiving data from MeNB and SeNB. A corresponding downlink reception pattern may thus be defined for handling the downlink communications with the MeNB and SeNB. This depends on whether the UE supports only single reception or supports dual reception, where the UE may simultaneously receive downlink transmissions from the MeNB and SeNB in the same subframe. As explained already before, even if the UE would be capable of dual reception, there might still be cases where the UE is configured differently to operate according to single reception, i.e. to not support dual reception.

Usually, the UE indicates its receiving capability (i.e. single or dual reception) to the relevant base station, e.g. the MeNB, which in turn can still decide whether UE should use the dual reception according to its capability or should only communicate according to single reception. Therefore, the decision is not taken by the UE but some other entity, and the UE needs to be informed as to how it should operate.

According to one variant, the MeNB (could be in principle another network node like SeNB) sends a corresponding reception configuration indication to the UE, informing the UE as to whether it should actually support or not dual reception. Therefore, the UE is informed about the reception configuration (single RX or dual RX) in addition to being informed about the uplink transmission pattern that shall be used. The reception configuration indication can be in the form of a one-bit flag, where one value indicates support of dual RX and the other value indicates support of only single RX. A further alternative of how to implement the reception configuration indication will be presented later in connection with the HARQ protocol operation; namely, the maximum multiplexing/bundling size configuration parameter may be re-used, such that a particular value (e.g. 1) of the maximum multiplexing/bundling size configuration parameter indicates the use of single RX, while any other value indicates dual RX.

Both information are necessary for determining the downlink reception pattern to be applied by the mobile station and the MeNB and SeNB. According to one variant of the first embodiment, each of the UE, MeNB and SeNB receives the information on the uplink transmission pattern and the reception configuration of the UE, and can thus derive for themselves the downlink reception pattern that shall be applied, as will be explained in detail further below.

Alternatively of course, one of the entities may derive the downlink reception pattern and may then inform the other entities about it; this comes at the cost of more signaling that is needed to transmit the complete downlink reception pattern.

The downlink reception pattern can be derived from the uplink transmission pattern and the reception configuration indication as follows. In case the reception configuration indication configures the UE to support dual reception (only possible when UE previously indicated that it is capable of dual RX), then the UE is able to receive a downlink transmission (PDCCH/PDSCH) simultaneously from both nodes (MeNB and SeNB) in one TTI (i.e. subframe). Correspondingly, every subframe can be used by both nodes for downlink transmissions, and the downlink reception pattern simply defines every subframe to be usable for simultaneous downlink transmissions from the MeNB and the SeNB; this is depicted in the lower part of FIG. 21, which discloses the uplink transmission pattern of FIG. 15, and is expanded to illustrate the corresponding downlink reception patterns for the single RX and dual RX case. For dual RX there are no restrictions from downlink scheduling perspective, such that PDCCH/PDSCH can be scheduled in every subframe. However, as will be explained later, HARQ operation has to be defined and handled appropriately.

More interesting and challenging is the case where the UE shall not support dual RX; be it because it is not capable thereof, or because it is configured by the MeNB in that way. The downlink scheduling flexibility is greatly impacted; downlink resources are partitioned based on the uplink transmission pattern (see below), such that both the macro cell and the small cell are forced to only use a subset of the subframes within a radio frame for PDSCH/PDCCH.

The downlink reception pattern for the single RX case is derived by considering some predefined rules. The Rel-8 timing relation for PDCCH/PDSCH and for PUSCH/PUCCH shall be kept, meaning that a downlink subframe (possibly carrying an uplink grant, PDCCH) shall be 4 ms prior to the uplink subframe carrying the corresponding PUSCH as granted by the received PDCCH. Taking the uplink transmission pattern of FIG. 15/21 as an example to explain this principle; when considering the macro cell, subframes 1 and 6 are defined to be available for an uplink transmission to the MeNB. Correspondingly, subframes 2 (6-4) and 7 (10+1-4) are then defined to be available for receiving a downlink transmission from the MeNB. The same applies to the subframes defined for uplink communication in the small cell.

Basically as can be appreciated from FIG. 21, the uplink transmission pattern is shifted ahead by 4 subframes to arrive at the downlink reception pattern (i.e. n to n−4), with the important difference of course that subframes defined to be available for uplink transmission to a particular eNB are re-defined to be available for downlink reception from that particular eNB, while subframes defined to be available for switching the uplink communication between the communication links are re-defined to be available for switching the downlink communication between the communication links.

FIGS. 22 and 23 respectively illustrate the downlink reception patterns for the corresponding uplink transmission patterns introduced in connection with FIGS. 17 and 18. As apparent from FIG. 22, for subframes 1 and 2 available to an uplink transmission to the MeNB, the corresponding downlink reception pattern defines subframes 7 (10+1−4) and 8 (10+2−4) to be available to receive a downlink transmission from the MeNB. Correspondingly, for subframes 4, 5, 6, 7, 8 and 9 available to an uplink transmission to the SeNB, the corresponding downlink reception pattern defines subframes 0 (4−4), 1 (5−4), 2 (6−4), 3 (7−4), 4 (8−4) and 5 (9−4) to be available to receive a downlink transmission from the SeNB.

The same principle for deriving the downlink reception pattern from the uplink transmission pattern can be applied to the patterns of FIGS. 18, 19 and 20, thus arriving at the downlink reception pattern as depicted in FIGS. 23, 24 and 25. For illustration purposes, only a few arrows are depicted in FIG. 21-25, showing the deriving principles to arrive at the downlink reception pattern based on the uplink transmission pattern.

As already hinted at above, in the first embodiment of the invention the HARQ operation needs to be adapted to the downlink reception patterns and the uplink transmission patterns. It is assumed that the UE and eNodeBs use the HARQ protocol for the downlink and uplink communication, such that failed transmissions can be performed again in the form of re-transmissions. In the following, the different cases of single RX and dual RX are treated separately. Part of the HARQ protocol operation will be explained in connection with FIG. 26, which takes as an example for illustrating the principles the uplink transmission pattern and downlink reception pattern of FIG. 15/21.

In the case where the UE supports only single reception, it is easily possible to fulfill the timing relations as given by the current standard for synchronous HARQ, namely that the HARQ feedback for a downlink transmission shall be transmitted in the uplink 4 subframes (ms) after. Due to how the downlink reception pattern is derived from the uplink transmission pattern, in case of single RX, for every subframe n usable for downlink a corresponding subframe n+4 usable for uplink communication is defined, which then can be used to transport the HARQ feedback (ACK/NACK) for the received downlink transmission. This is depicted in the upper part of FIG. 26. As indicated by the arrows labeled "ACK/NACK: +4 subframes", a corresponding HARQ ACK/NACK feedback for said subframe is transmitted in the uplink in the corresponding subframe 4 ms afterwards such that: the HARQ ACK/NACK for a downlink transmission of subframe 2/7 in the macro cell can be transmitted to the MeNB in subframe 6 (2+4)/11 (7+4); the HARQ ACK/

NACK for a downlink transmission of subframe 0/4/5/9 in the small cell can be transmitted to the SeNB in subframe 4(0+4)/8 (4+4)/9(5+4)/13(9+4).

Figure 26:
FIG. 26 illustrates the uplink transmission pattern and downlink reception pattern as introduced by FIG. 21, further expanded by the HARQ operation of multiplexing/bundling the HARQ feedback for downlink transmission in various subframes, according to the first embodiment.

In the case where the UE supports dual reception, basically all subframes of a radio frame can carry a downlink transmission for any communication link, which is problematic in case the UE does not support dual uplink, since in that case there is not for every downlink subframe n a corresponding uplink subframe n+4 4 ms after. To handle this situation where the PDSCH can be scheduled in every subframe, the associated HARQ ACK/NACK feedback for several PDSCH transmissions need to be multiplexed or bundled and then transmitted in multiplexed fashion in a corresponding uplink subframe, such that preferably it is possible to provide the HARQ ACK/NACK feedback for every downlink transmission. This is illustrated in the lower part of FIG. 26 for the macro cell and small cell respectively. As apparent, dual RX is assumed and all subframes in the macro cell and small cell are depicted as being available for a downlink transmission. Then, for the macro cell and the small cell separately FIG. 26 illustrates how the multiplexing/bundling of the HARQ feedback can be organized, taking into account that the timing relation of 4 ms between the downlink transmission and the corresponding HARQ feedback (ACK/NACK) in the uplink should be preferably fulfilled.

In general the fact that there are more downlink subframes than uplink subframes leads to a requirement to transmit in one uplink transmission subframe acknowledgments of multiple downlink transport blocks. Transmitting multiple HARQ ACK/NACKs in one uplink subframe requires a PUCCH format which is capable of carrying a larger volume of control data. This is in 3GPP commonly referred to as ACK/NACK multiplexing. According to an alternative mechanism the ACK/NACKs corresponding to multiple downlink transport blocks are combined prior to transmission on the uplink. Essentially the individual ACK/NACKs are passed through a logical AND operation in order to form a single HARQ feedback indicative of whether zero or more than zero transport blocks were received in error. The obvious disadvantage of this mechanism, which is also referred to as bundling, is that eNB doesn't know which of the transport blocks was erroneously received and as a consequence has to retransmit all of them. For the embodiments of this invention HARQ feedback multiplexing and/or bundling can be applied.

For said reason, the multiplexing/bundling of the HARQ feedback for the downlink subframes shall be done such that the last subframe out of the downlink subframes that are bundled shall occur 4 ms prior to the uplink subframe that carrier the bundled HARQ feedback for these bundled subframes. This will become clearer when applying this principle to the exemplary patterns of FIG. 26.

Now considering the macro cell first, it should be noted that the first available uplink subframe that could be used to carry HARQ feedback in the uplink to the MeNB is subframe 1, and thus cannot carry the HARQ feedback of the downlink subframe 0 since it is not a minimum of 4 subframes away. The next available uplink transmission opportunity, being in subframe 6, thus has to transport all the HARQ feedback of possible downlink transmissions up to and including the subframe 4 ms ahead of it, namely subframe 2 (6−4); the last subframe of the sequence of subframes, which HARQ feedback will be multiplexed/bundled, shall be 4 ms ahead of the subframe that will transport this particular bundled HARQ feedback. As depicted in FIG. 26, this means that the HARQ feedback of downlink subframes 0, 1 and 2 is multiplexed/bundled for transmission in the available uplink subframe 6.

The next available uplink opportunity for HARQ feedback in the uplink occurs at subframe 11 and thus has to transport all the pending HARQ feedback up to and including the subframe 4 ms ahead, i.e. subframe 7 (11−4). Correspondingly, the HARQ feedback of downlink subframes 3, 4, 5, 6 and 7 is multiplexed/bundled for transmission in the uplink subframe 11. This principle is applied continuously for communications in the macro cell.

The UE as well as the MeNB use this very same rule to determine the multiplexing/bundling of HARQ feedback and can thus follow the same uplink and downlink pattern.

The above is equally applicable to the HARQ operation for the small cell. The first uplink subframe available for HARQ feedback transmission to the SeNB is subframe 3, which is however too early to transport any HARQ feedback at all. The next uplink subframe available for HARQ feedback transmission to the SeNB is subframe 4, and thus can transport the HARQ feedback for a downlink transmission in subframe 0; but not the HARQ feedback for any of the downlink subframes 1, 2 or 3 for not being at least 4 ms ahead.

The next uplink subframe available for HARQ feedback transmission to the SeNB is subframe 8 and thus shall transport all the pending HARQ feedback up to and including the subframe that is 4 ms ahead; i.e. subframe 4 (8−4). Correspondingly, the HARQ feedback for downlink transmissions in subframes 1, 2, 3 and 4 is multiplexed/bundled for transmission in the uplink subframe 8. This principle is applied continuously for communications in the small cell, as illustrated in FIG. 26.

As currently explained, for the dual reception case, the PDSCH can be scheduled in every subframe, i.e. there is no restriction from scheduling point of view. For this reason, and also depending on the particular uplink transmission pattern applied, the number of bundled/multiplexed HARQ feedback ACK/NACKs could potentially be large. This might compromise the reliability of the PUCCH carrying the HARQ feedback; respectively, degrade the HARQ efficiency.

According to a further variant of the first embodiment, a maximum multiplexing/bundling size is configured, so as to limit the amount of HARQ feedback that may be transmitted in the uplink within one subframe. The maximum multiplexing/bundling size can be determined by one of the base stations (e.g. the MeNB) and may thus be informed to the UE, in addition to the uplink transmission pattern and the reception configuration indication.

The maximum multiplexing/bundling size indicates the maximum number of subframes for which HARQ feedback can be multiplexed/bundled and transmitted in one uplink subframe. Correspondingly, a maximum multiplexing/bundling size of 2 means that the HARQ feedback of only two downlink subframes may be multiplexed/bundled. This will be explained in connection with FIG. 27, which is very similar to the one of FIG. 26, with the additional aspect of having a maximum bundling size of 3 configured for the macro cell and a maximum multiplexing/bundling size of 2 configured for the small cell.

Figure 27:
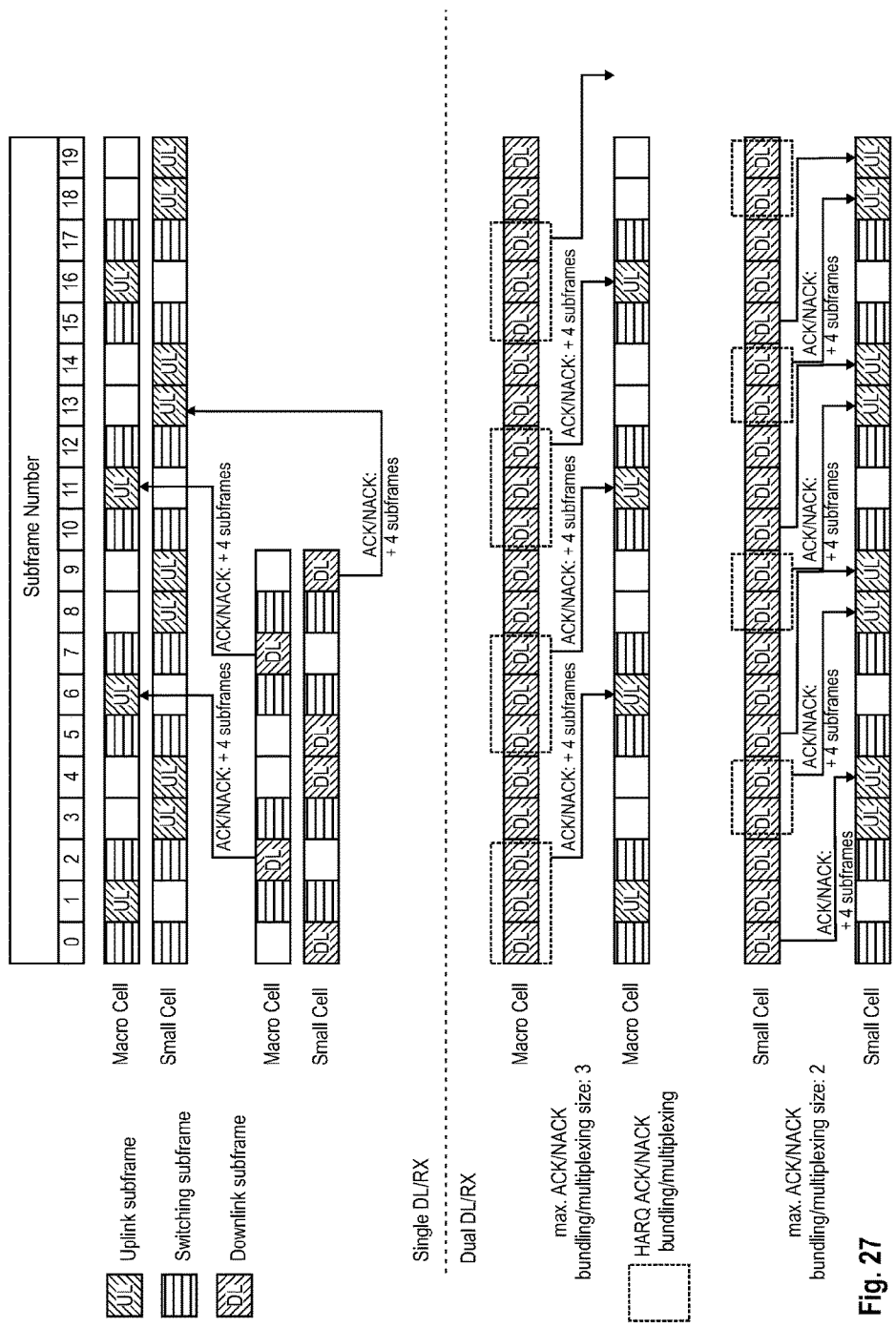
FIG. 27 illustrates the uplink transmission pattern and the downlink reception pattern as introduced by FIG. 21, further expanded by the HARQ operation of multiplexing/bundling the HARQ for downlink transmissions in various subframes but with a maximum multiplexing/bundling size, according to the first embodiment.

As apparent from comparing the upper parts of FIGS. 26 and 27, the HARQ operation for the case where only single RX is supported stays the same; which is not surprising in view of that no HARQ feedback multiplexing/bundling is performed. For the case, where the UE is supporting dual reception, the HARQ operation changes significantly depending on the configured maximum multiplexing/bundling size that is applicable.

For the macro cell, the HARQ feedback for downlink subframes 0, 1 and 2 is multiplexed/bundled and transmitted to the MeNB in uplink subframe 6; this is the same as for FIG. 26 since the maximum multiplexing/bundling size is 3. However, the maximum multiplexing/bundling size of 3 has an effect on the subsequent downlink subframes 3 and 4 for which no HARQ feedback can be transmitted in the uplink, since in subframe 11 only the HARQ feedback for downlink subframes 5, 6 and 7 can be transported to the MeNB. Again the last subframe of a sequence of subframes which HARQ feedback is multiplexed/bundled shall be 4 ms ahead of the uplink subframe actually transporting the multiplexed/bundled HARQ feedback. The same principles can be applied to the remaining downlink subframes, as depicted in FIG. 27. As a result, no HARQ feedback can be transmitted in the uplink to the MeNB for downlink transmissions in downlink subframes 3, 4, 8, 9, 13, 14 etc.

For the small cell, the same principles can be applied too. Correspondingly, while the HARQ feedback for the possible downlink transmission in subframe 0 can be transmitted to the SeNB in the uplink subframe 4, there is no possibility of transmitting a HARQ feedback for downlink transmissions in subframes 1 and 2, in view of the maximum multiplexing/bundling size of 2. In particular, because of that HARQ feedback of only two subframes can be multiplexed/bundled and transmitted in multiplexed fashion in the uplink to the SeNB, the uplink subframe 8 can only carry the HARQ feedback for downlink transmissions in subframes 3 and 4; again, the last subframe 4 of the sequence of multiplexed/bundled subframes shall be 4 ms ahead of the subframe carrying the multiplexed/bundled HARQ feedback.

The same principle can be applied to the remaining subframes of the small cell as illustrated at the bottom of FIG. 27. As a result, no HARQ feedback can be transmitted in the uplink to the SeNB for downlink transmissions in downlink subframes 1, 2, 6, 7, 11, 12 etc.

Based on the above principles, also the MeNB and SeNB can derive for which downlink transmissions no HARQ feedback would be available and can adapt the scheduling accordingly. For instance, although farfetched, the MeNB and SeNB can still schedule PDSCH transmissions (for which the HARQ protocol is normally active; HARQ feedback is usually expected) for those particular subframes for which no HARQ feedback is available.

However, it might be more beneficial that the MeNB and SeNB uses those particular subframes for which no HARQ feedback is available to perform downlink transmissions for which no HARQ protocol is applicable, such as broadcast transmissions (MBMS) or system information. In a further alternative those subframes will not be used at all for downlink scheduling. Even though this would obviously reduce the scheduling efficiency, on the other hand those subframes could be used for interference coordination among neighbor cells on the same frequency.

According to a further variant, the maximum multiplexing/bundling size can be re-used as the reception configuration indication mentioned earlier. In particular, the maximum multiplexing/bundling size, which is also transmitted to the UE as a configuration message, can be re-used to indicate whether the UE shall support single RX or dual RX, alternatively to the above-mentioned one-bit flag. For instance, one particular value, such as 1, of the maximum multiplexing/bundling size is reserved to mean that the UE shall support only single RX; whereas all other possible values of the maximum bundling size are interpreted by the UE to mean it is configured to support dual RX.

A further aspect that is to be taken into account for the first embodiment of the invention, is how the synchronous uplink HARQ protocol is to be performed with respect to the selection of HARQ processes. According to the definition in Rel.-8, the uplink HARQ protocol has a fixed HARQ round trip time (RTT) of 8 ms. In the synchronous uplink HARQ operation uplink transmission opportunities for one HARQ process are always reoccurring every 8 ms; e.g. a retransmission for an initial transmission, handled by a particular HARQ process, is expected exactly 8 ms after reception of the initial transmission. As is apparent from the uplink transmission pattern and corresponding downlink reception pattern of e.g. FIG. 21, this 8 ms timing relation for HARQ RTT is not fulfilled. Assuming that an uplink transmission in subframe 1 of the macro cell, for which HARQ process 0 is assigned, needs to be retransmitted due to errors on the radio channel, then, the corresponding retransmission would have to be effected in subframe 9 (1+8), which however is not possible since subframe 9 is only available for uplink transmissions in the small cell. Therefore, this 8 ms timing relation for the HARQ RTT cannot be fulfilled.

According to a variant of the first embodiment of the invention, the HARQ protocol is still synchronous, i.e. the uplink HARQ processes are used in a consecutive order. The number of uplink HARQ processes is however defined based on the minimum (not fixed anymore) HARQ RTT of 8 ms. In other words, according to this variant, the time between two transmission opportunities for the same HARQ process can be larger than 8 ms, but 8 ms is the minimum. At the same time, the HARQ RTT for one HARQ process should be minimized in order not to increase the delay.

When applying this rule to the scenario of FIG. 21, this would result in that two uplink HARQ processes are needed to deal with the uplink transmissions in the macro cell with a HARQ RTT of 10 ms. Particularly, HARQ process 0 can be assigned to the uplink transmission subframes 1, 11, 21 etc. and HARQ process 1 can be assigned to the uplink transmission subframes 6, 16, 26 etc.

Likewise, four HARQ processes are need to deal with the uplink transmissions in the small cell, again with a HARQ RTT of 10 ms. In particular, HARQ process 0 can be assigned to the uplink transmission subframes 3, 13, 23 etc.; HARQ process 1 to uplink transmission subframes 4, 14, 24 etc.; HARQ process 2 to uplink transmission subframes 8, 18, 28 etc.; and HARQ process 3 to uplink transmission subframes 9, 19, 29 etc.

The same principle can be applied to the other examples of uplink transmission patterns given in the present application, namely to the ones of FIGS. 22, 23, 24 and 25. For FIG. 22 two HARQ processes are needed for dealing with the uplink transmissions in the macro cell, with a HARQ RTT of 10 ms; and six HARQ processes are needed for dealing with the uplink transmissions in the small cell, again with a HARQ RTT of 10 ms.

For FIG. 23 three HARQ processes are needed for dealing with uplink transmissions in the macro cell and respectively small cell, with respectively a HARQ RTT of 10 ms.

For FIG. 24 four HARQ processes are needed for the macro cell and 6 UL HARQ processes for the small cell. For the macro cell uplink transmissions for the first HARQ process would be in subframe 0 and 18, subframes 1 and 19 would be associated to the second HARQ process, subframe 7 to the third HARQ process and subframe 13 to the fourth HARQ process. As can be seen the HARQ RTT is not fixed anymore but varies for the HARQ processes.

It is generally also possible to keep the Rel.-HARQ timing (HARQ RTT) by choosing a different length for the uplink transmission pattern, e.g. by using a 40 ms length.

An assumption for the dual connectivity concept is that certain bearers are mapped on the macro cell whereas other bearers are configured for the small cell. More in particular, the delay critical services like RRC signaling (SRBs) and VoIP are transmitted on the macro cell, which has a large coverage area. On the other hand, delay tolerant services like web-browsing are transmitted on the small cell. Since the schedulers in the MeNB and the SeNB are working independently from one another, information on only those bearers which are transmitted in the respective cell is needed in the respective scheduler. Hence, the UE will consider only those radio bearers for the buffer status reporting which are scheduled in the corresponding cell. For example, it is assumed that signaling radio bearers SRB#1, SRB#2 and data radio bearer DRB#1 are configured in the macro cell, and data radio bearers DRB#2 and DRB#3 are configured in the small cell. Based on this assumption, the UE would thus report the buffer status report for only DRB#2 and DRB#3 to the SeNB, since the scheduler in the SeNB is only interested in data of those bearer). Likewise, the UE would report the BSR for only SRB#1, SRB#2 and DRB#1 to the MeNB. In other words, there will be a "macro cell BSR" and a "small cell BSR" where different information will be reported to the different eNBs.

Furthermore, for every communication link (i.e. macro cell connection and small cell connection), the UE will be configured with independent logical channel groups, i.e. Rel.8 LCG configuration per cell.

A further variant takes into account that for the purpose of determining a suitable uplink transmission pattern, the eNodeB responsible for determining the uplink transmission pattern should understand the UL activity in all cells. Only then can he take a thorough decision on the sharing of the uplink subframes across macro and small cell.

Therefore, If assuming that the MeNB is taken the decision on the uplink transmission pattern, the UE reports to the MeNB also the small cell related BSR. Alternatively, instead of that the UE report the small cell BSR to the MeNB, the SeNB could also forward the received small cell BSR over the Xn interface to the MeNB.

Furthermore according to another variant, semi-persistent scheduling (SPS) configurations and PUCCH configurations should be exchanged between the involved Node Bs in order to allow for determining a suitable uplink transmission pattern.

Second Embodiment

The second embodiment of the invention deals with the same problem as the first embodiment, however does not coordinate the uplink transmission on small cell and macro cell as done in the first embodiment. It is assumed that the UE does not support dual uplink.

The underlying assumption for the second embodiment is that the probability of a collision between two uplink transmissions is rather low, since it is assumed that most traffic will be handled in the small cell, and only RRC signaling and other delay-critical traffic (like VoIP) is conveyed in the macro cell. For said reasons, the probability that the UE receives an uplink grant from both the SeNB and the MeNB in the same TTI (i.e. subframe), is relative low.

In order to further reduce this collision probability, the macro cell could inform the small cell over the Xn interface about SPS configurations used in the macro cell, and/or vice versa. In doing so, the small cell scheduler and/or the macro cell scheduler could take the SPS opportunities of the other cell into account for scheduling uplink and downlink transmissions. Furthermore, configurations for periodic CSI/SRS may be also coordinated between the macro cell and the small cell, such that they do not overlap and are due in the same (or adjacent) subframes.

For the case that all the downlink traffic transmitted from the SeNB is routed via the MeNB (see FIGS. 14b,c), the MeNB has some knowledge of when downlink transmissions from the small cell scheduled can be expected. For the case that the S1-U is also established between SeNB and S-GW (see FIG. 14a), some scheduling info could be transferred between SeNB and MeNB in order to allow for a further reduction of the collision probability. For the purpose of getting a better picture on the uplink status of the UE, it would be useful if the UE would transmit the buffer status report information for all bearers to both the macro and the small cell.

Although the probability is low and may be lowered further (as suggested above), it will still happen that the UE is scheduled from both eNBs for an uplink transmission in the same subframe.

To provide a solution to this collision problem, according to the second embodiment of the invention, priority rules are predetermined, according to which the UE may prioritize one of the colliding uplink communication over the other for the particular subframe. Thus, in case of collision, only the uplink communication with the higher priority is actually transmitted, and the other uplink communication with the lower priority is not transmitted.

The priority rules can be based on various parameters and may be quite flexibly defined. Examples will be given in the following, which however should not be regarded as limiting the invention in said respect.

A simple rule would be to prioritize transmissions in the macro cell (e.g. PUCCH, PUSCH, PDCCH, PDSCH) over corresponding transmissions in the small cell, since the macro cell conveys RRC signaling and delay critical data, which has higher priority than non-delay-critical data transmitted in the small cell.

Other priority rules could more generally take into account what kind of data is transmitted by the base stations; this might be independent from the small cell or macro cell.

Other priority rules could e.g. refer to the category of the base stations, or to the Quality of Service (Qos) of the data to be transmitted in the pending and colliding uplink transmissions, or to the Quality of Experience.

The priority rules may also be a combination of various, and may be a whole set of rules.

In the following table, exemplary priority rules are defined, thus indicating how the UE shall behave in the event of a collision.

| Small Cell | Macro Cell | UE behavior |
|---|---|---|
| PUSCH | PUSCH | Prioritize PUSCH of macro cell |
| PUSCH | PUCCH (Ack/Nack or Scheduling Request SR) | Prioritize PUCCH of macro cell |
| PUSCH | PUCCH (CQI)/SRS | Prioritize PUSCH of small cell. No mux of PUCCH info into PUSCH |

-continued

| Small Cell | Macro Cell | UE behavior |
|---|---|---|
| PUCCH | PUSCH | Prioritize PUSCH of Macro cell, no mux of PUCH into PUSCH |
| PUCCH (SR/ACK/CQI)/SRS | PUCCH (SR/ACK) | Prioritize PUCCH of Macro cell |
| PUCCH (ACK/SR) | PUCCH (CQI) | Prioritize PUCCH of Small cell |

Correspondingly, in case of collision of a PUSCH transmission for the macro cell and PUSCH transmission for the small cell for the same subframe, the uplink transmission for the macro cell is prioritized such that this high priority PUSCH transmission is performed, and the pending PUSCH transmission for the small cell is dropped. For example, when the UE is scheduled for PUSCH transmissions for both communication links for the same subframe n (by corresponding grants via the PDCCH in subframe n−4), the UE will follow the grant from the MeNB but not the one from the SeNB.

Those uplink transmissions that are not performed due to having a lower priority in the event of a collision, may be either discarded (similar to missing a PDCCH grant) or transmitted at a later point in time.

In an advantageous variant of the second embodiment, the schedulers shall be informed of the collision, since this may not only be a one-shot collision (like for the case of a collision with a measurement gap) but rather a blocking of a HARQ process (also considering potential retransmissions). To said end, new signaling might be introduced so as to inform the SeNB and/or the MeNB, as appropriate, about the collision case. The scheduler in the SeNB/MeNB might thus take this into account for future scheduling decisions. This new signaling could be for example signaling of the physical layer or MAC layer. For instance, a new MAC control element could be defined, or an additional information could be added within a MAC control element header.

The above discussion on possible collision only focused on the collision of uplink communication pending for both communication links in the same subframe. However, due to the necessary switching time to switch the uplink communication from one communication link to the other, it is also not possible to transmit two uplink communications in respectively two subsequent subframes. Therefore for this kind of collision for subsequent subframe n and n+1, a further solution is advantageous. Basically the same principles as applied for the collision in one subframe can be applied to a collision between two subsequent subframes, such that one of the two uplink transmissions is prioritized over the other one, with the result that only the uplink transmission with the higher priority is transmitted in the corresponding subframe, while the other uplink transmission with the lower priority is not transmitted.

For example, in case an SPS opportunity is in subframe n on macro cell, then, the UE shall not perform an uplink transmission in subframe n−1 for the small cell (corresponding PDCCH grant was received in n−5). As discussed previously for the collision in one subframe, the UE shall not follow the PDCCH received in subframe n−5, and may optionally delay this uplink transmission to the next uplink transmission opportunity.

Another example, illustrating how an interruption time of 1 ms could be achieved for this alternative, is when the UE receives a PDCCH from the small cell in subframe n, and a PDCCH from macro cell in subframe n+1, then, the UE will not send the HARQ feedback ACK/NACK in subframe n+4 for the small cell, since it has to send the HARQ ACK/NACK in subframe n+5 in the macro cell; i.e. the transmission in macro cell is prioritized over the transmission in the small cell. Essentially, in order to ensure the necessary interruption time due to switching the prioritization between small cell and macro cell would not only be for simultaneous uplink transmissions within one TTI (Subframe) but also across two adjacent TTIs (subframes).

Third Embodiment

The first and second embodiments described above which mainly assumes an FDD scenario where downlink and uplink frequencies are separated. However, scenariosmay also be foreseen where small cell(s) and/or the macro cell are configured with TDD, for which the third embodiment provides a solution from the one of the first and second embodiment.

Figures 6, 7:
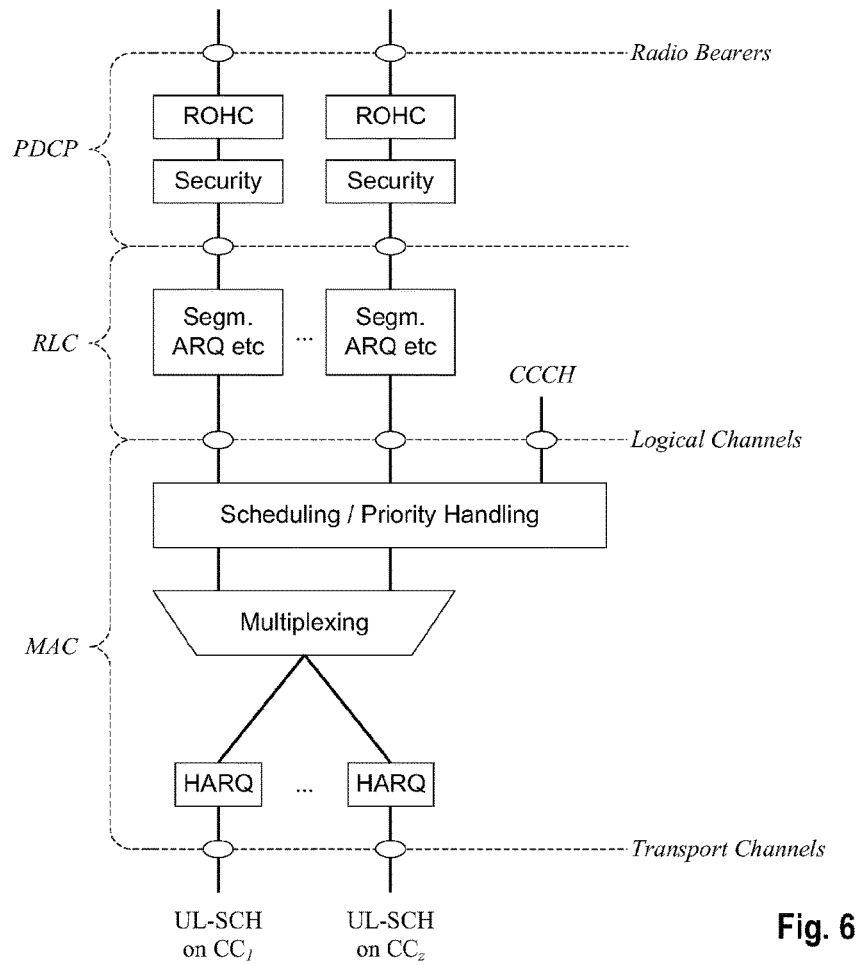
FIG. 7 shows the seven currently-standardized (static) TDD UL/DL configurations 0-6, the respective definitions of the 10 subframes and their switch-point periodicity.
Figure 8:
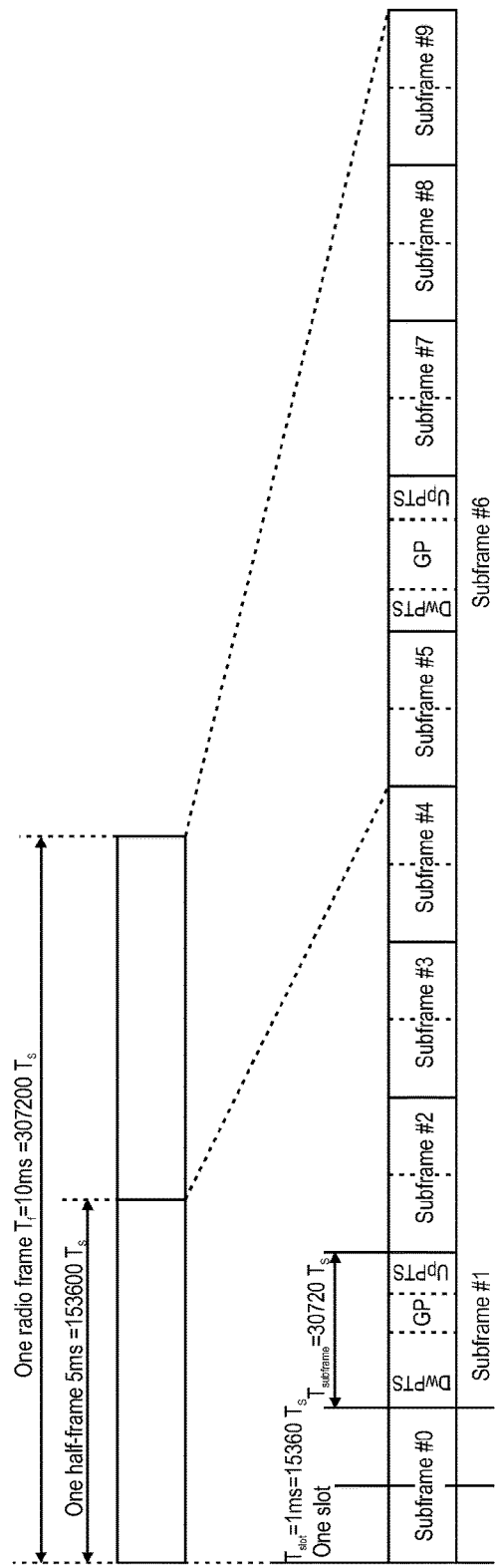
FIG. 8 illustrates the structure of a radio frame, being composed of two half-frames and 10 subframes, for a 5 ms switch-point periodicity.
Figure 28:
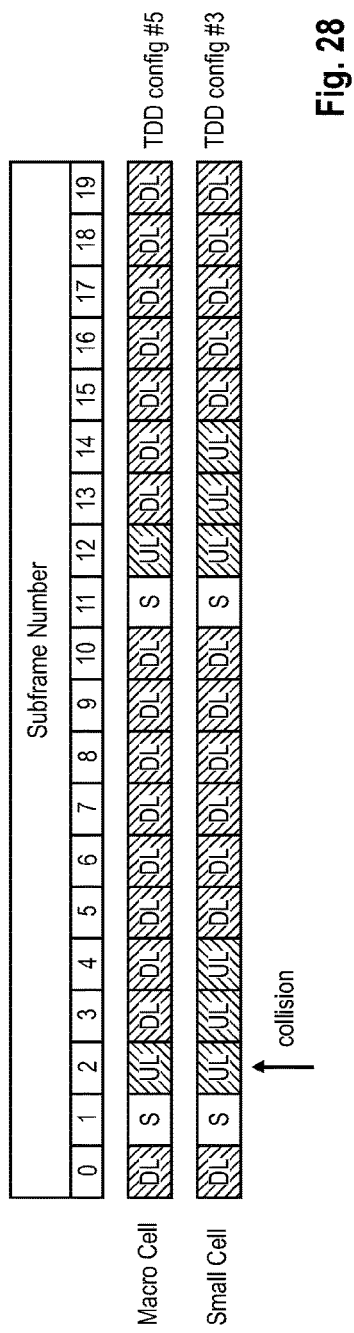
FIG. 28 illustrates the use of two different TDD configurations in the macro cell and the small cell, and a corresponding collision of uplink transmissions in subframe 3.

As explained in the background section, one characteristic of the TDD configurations available for LTE is that in each TDD configuration the third subframe is an uplink subframe (see FIG. 7). Therefore, there would be already some inherent problem for UEs that are only capable of single uplink. For example, assuming that the TDD UL/DL configuration #5 is configured for the macro cell and the TDD UL/DL configuration #3 for the small cell, it is likely that there will be a collision in every third subframe of a radio frame; uplink subframe of both macro and small cell (see FIG. 28).

Of course, so as to handle a possible collision the priority rules as discussed in connection with the second embodiment could be applied so as to prioritize one uplink communication over the other (e.g. the uplink subframe of the macro cell has in general a higher priority than the uplink subframe of the small cell).

Furthermore and similar to the second embodiment, also the interruption time needed to switch the uplink communication from one communication link to the other needs to be considered, such that adjacent uplink subframes may also cause collisions. As with the second embodiment, the priority rules can be applies to solve the collisions. Alternatively, instead of applying the priority rules, some overlay pattern, i.e. pattern which is applied on top of the TDD configurations, could be used which identifies which link UE should use in a specific subframe. Thereby collisions could be also avoided.

Figure 29:
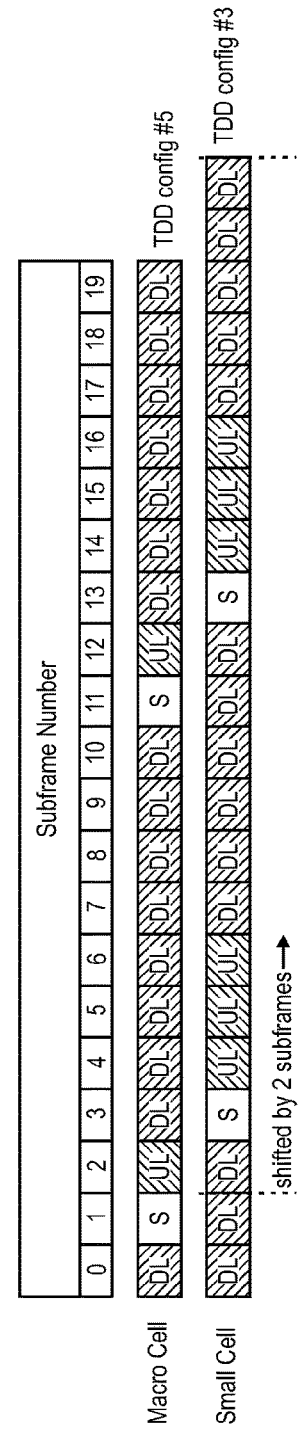
FIG. 29 is similar to FIG. 28, but further illustrates the shifting of the TDD configuration of the small cell by 2 subframes compared to the TDD configuration of the macro cell, according to a third embodiment of the invention.

According to another different solution for the third embodiment, the TDD configurations are shifted in time so as to avoid the uplink collisions. This is illustrated in FIG. 29 for the given example of TDD configuration 3 in the small cell, which is shifted by 2 subframes compared to the TDD configuration #5 in the macro cell. Due to the shifting, which could be either only configured for users in "dual connectivity" or alternatively for the whole cell, the uplink collision is avoided. Also a 1 ms gap between two uplink subframes on different cells is ensured.

According to still another alternative embodiment, the switching subframe coincides with the special subframe in a TDD configuration. As explained in the background section, a special subframe includes three fields: DwPTS, GP and UpPTS. Since the actual switching time might be only at most 350 ps, as disclosed, the uplink switching time might fit into the guard period of the special subframe. Hence, the UE would still be able to use the rest of the subframe for uplink grant reception (DwPTS) or for sending SRS (UpPTS). If the Guard period would be too short for covering the whole switching time, the UE could at least use the DwPTS field (for UL grant reception) or the UpPTS (for SRS transmission).

According to still another alternative embodiment, some new pattern could be defined, where UE switches between the two configured TDD configurations. Since the TDD configurations defined in 3GPP have either a Dowlink-to-Uplink Switch-point periodicity of 5 ms or 10 ms, the UE would, for the case that the TDD configurations for macro cell and small cell have a periodicity of 5 ms, switch at every special subframe between the configured TDD configurations. Basically every 5 ms the UE switches the link for data communication. The HARQ protocol operation would need to be adapted accordingly, i.e. timing relations will change.

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method, comprising:
   receiving, by a mobile station, an uplink transmission pattern and a reception configuration indication, wherein
      the reception configuration indication instructs the mobile station to support or not support simultaneous reception of data within the same subframe from a first base station via a first communication link and a second base station via a second communication link, and
      the received uplink transmission pattern includes information on a predetermined number of subframes defining which subframes are usable by the mobile station for uplink transmissions via the first communication link to the first base station, which subframes are usable by the mobile station for uplink transmissions via the second communication link to the second base station, or which subframes are usable by the mobile station for switching uplink communication between the first and the second communication link; and
   determining, by the mobile station, a downlink reception pattern based on the reception configuration indication, wherein
      in response to the reception configuration indication instructing the mobile station to support the simultaneous reception of data, the downlink reception pattern defining a plurality of subframes that are usable by the mobile station for downlink reception via the first communication link from the first base station and via the second communication link from the second base station, and
      in response to the reception configuration indication instructing the mobile station to not support the simultaneous reception of data, the downlink reception pattern defining, based on the uplink transmission pattern, which subframes are usable by the mobile station for downlink reception via the first communication link from the first base station, which subframes are usable by the mobile station for downlink reception via the second communication link from the second base station, and which subframes are usable by the mobile station for switching downlink communication between the first and the second communication link.

2. The method according to claim 1, wherein the reception configuration indication includes either:
   a one bit flag indicating to support or not support the simultaneous reception of data, or
   an information element indicating a maximum multiplexing size, indicating a maximum number of acknowledgements/non-acknowledgements that can be multiplexed and transmitted in one subframe usable for uplink transmissions.

3. The method according to claim 1, wherein the uplink transmission pattern includes information on a predetermined number of subframes defining which subframes are usable by the mobile station for uplink transmissions via the first communication link to the first base station, and which subframes are usable by the mobile station for uplink transmissions via the second communication link to the second base station, or
   wherein the uplink transmission pattern includes information only on a predetermined number of subframes defining which subframes are usable by the mobile station for uplink transmissions via the first communication link to the first base station, the method further includes receiving, by the mobile station, another uplink transmission pattern, and the another uplink transmission pattern includes information on a predetermined number of subframes defining which subframes are usable by the mobile station for uplink transmission via the second communication link to the second base station, and which subframes are usable by the mobile station for switching between the first and second communication link.

4. The method according to claim 1, wherein, in response to the reception configuration indication instructing the mobile station to not support the simultaneous reception of data, the determining of the downlink reception pattern includes:

determining a subframe n–4, that is four subframes before a subframe n which is usable for uplink transmissions via the first communication link to the first base station, to be usable for downlink reception via the first communication link from the first base station;

determining a subframe n–4, that is four subframes before a subframe n which is usable for uplink transmissions via the second communication link to the second base station, to be usable for downlink reception via the second communication link from the second base station; and determining a subframe n–4, that is four subframes before a subframe n which is usable by the mobile node for switching uplink communication between the first and the second communication link, to be usable for switching downlink communication between the first and the second communication link.

5. The method according to claim 1, wherein a downlink Hybrid Automatic Repeat Request (HARQ) protocol is used for downlink communication via the first and second communication links, and the method further includes:

bundling or multiplexing, by the mobile station, acknowledgements/non-acknowledgments for data, received by the mobile station in a plurality of consecutive subframes;

transmitting, by the mobile station, the acknowledgements/non-acknowledgments for data in a subframe usable for uplink transmissions that is four subframes after the last subframe of the plurality of consecutive subframes.

6. The method according to claim 5, wherein the mobile station is configured with a maximum multiplexing size, the maximum multiplexing size indicating a maximum number of acknowledgements/non-acknowledgements that can be multiplexed and transmitted in one subframe usable for uplink transmissions.

7. The method according to claim 1, wherein a Hybrid Automatic Repeat Request (HARQ) protocol with a plurality of HARQ processes is used for uplink communication via the first and second communication links, and the method further includes:

determining, by the mobile station, which HARQ processes out of the plurality of HARQ processes are used for uplink communication according to the uplink transmission pattern, such that a minimum round trip time of 8 ms is fulfilled for the HARQ protocol.

8. The method according to claim 1, wherein the uplink transmission pattern is received by the first or second base station using a Media Access Control (MAC) protocol, Radio Resource Control (RRC) protocol, or physical layer signaling.

9. The method according to claim 1, further comprising:

transmitting, by the mobile station, to a base station which is to transmit the reception configuration indication, information on a capability of the mobile station to support simultaneous reception of data within the same subframe from the first base station via the first communication link and the second base station via the second communication link.

10. The method according to claim 1, further comprising:

preparing, by the mobile station, a first buffer status report based on uplink data to be transmitted via the first communication link;

preparing, by the mobile station, a second buffer status report based on uplink data to be transmitted via the second communication link;

transmitting, by the mobile station, the first buffer status report to the first base station;

transmitting, by the mobile station, the second buffer status report to the second base station; and in a case where the first base station determines the uplink transmission pattern:

transmitting, by the mobile station, the second buffer status report to the first base station, or transmitting, by the second base station, the second buffer status report to the first base station.

11. A mobile station, comprising:

a receiver, which, in operation, receives an uplink transmission pattern and a reception configuration indication, wherein the reception configuration indication instructs the mobile station to support or not support simultaneous reception of data within the same subframe from a first base station via a first communication link and a second base station via a second communication link, and the received uplink transmission pattern includes information on a predetermined number of subframes defining which subframes are usable by the mobile station for uplink transmissions via the first communication link to the first base station, which subframes are usable by the mobile station for uplink transmissions via the second communication link to the second base station, or which subframes are usable by the mobile station for switching uplink communication between the first and the second communication link; and a processor, which, in operation, determines a downlink reception pattern based on the reception configuration indication, wherein in response to the reception configuration indication instructing the mobile station to support the simultaneous reception of data, the downlink reception pattern defining a plurality of subframes that are usable by the mobile station for downlink reception via the first communication link from the first base station and via the second communication link from the second base station, and in response to the reception configuration indication instructing the mobile station to not support the simultaneous reception of data, the downlink reception pattern defining, based on the uplink transmission pattern, defining, based on the uplink transmission pattern, which subframes are usable by the mobile station for downlink reception via the first communication link from the first base station, which subframes are usable by the mobile station for downlink reception via the second communication link from the second base station, and which subframes are usable by the mobile station for switching downlink communication between the first and the second communication link.

12. The mobile station according to claim 11, wherein, in response to the reception configuration indication instructing the mobile station to not support the simultaneous reception of data, the processor, in operation:

determines a subframe n–4, that is four subframes before a subframe n which is usable for uplink transmissions via the first communication link to the first base station, to be usable for downlink reception via the first communication link from the first base station;

determines a subframe n–4, that is four subframes before a subframe n which is usable for uplink transmissions via the second communication link to the second base station, to be usable for downlink reception via the second communication link from the second base station; and determines a subframe n−4, that is four subframes before a subframe n which is usable by the mobile node for switching uplink communication between the first and the second communication link, to be usable for switching downlink communication between the first and the second communication link.

13. The mobile station according to claim 11, wherein a downlink Hybrid Automatic Repeat Request (HARQ) protocol is used for downlink communication via the first and second communication links, wherein the processor, in operation, bundles or multiplexes acknowledgements/non-acknowledgments for data received by the mobile station in plurality of consecutive subframes wherein the mobile station includes a transmitter, which, in operation, transmits the acknowledgements/non-acknowledgments for data in a subframe usable for uplink transmissions that is four subframes after the last subframe of the plurality of consecutive subframes.

14. The mobile station according to claim 13 wherein the mobile station is configured with a maximum multiplexing size, the maximum multiplexing size indicating a maximum number of acknowledgements/non-acknowledgements that can be multiplexed and transmitted in one subframe usable for uplink transmissions.

15. The mobile station according to claim 11, wherein a Hybrid Automatic Repeat Request (HARQ) protocol with a plurality of HARQ processes is used for uplink communication via the first and second communication links, and wherein the processor, in operation, determines which HARQ processes out of the plurality of HARQ processes are used for uplink communication according to the uplink transmission pattern, such that a minimum round trip time of 8 ms is fulfilled for the HARQ protocol.

16. The mobile station according to claim 11, further comprising:

a transmitter, which, in operation, transmits to a base station which is to transmit the reception configuration indication, information on a capability of the mobile station to support simultaneous reception of data within the same subframe from the first base station via the first communication link and the second base station via the second communication link.

17. The mobile station according to claim 11, wherein the processor, in operation:

prepares a first buffer status report based on uplink data to be transmitted via the first communication link; and prepares a second buffer status report based on uplink data to be transmitted via the second communication link, wherein the mobile station includes a transmitter, which, in operation:

transmits the first buffer status report to the first base station;

transmits the second buffer status report to the second base station; and in a case where the first base station determines the uplink transmission pattern, transmits the second buffer status report to the first base station.

* * * * *